United States Patent
Da Silva Martins et al.

(10) Patent No.: US 11,962,816 B2
(45) Date of Patent: Apr. 16, 2024

(54) METHOD AND DEVICE FOR LIVE-STREAMING WITH OPPORTUNISTIC MOBILE EDGE CLOUD OFFLOADING

(71) Applicants: UNIVERSIDADE DO PORTO, Oporto (PT); INESC TEC—Instituto de Engenharia de Sistemas e Computadores, Tecnologia e Ciência, Oporto (PT)

(72) Inventors: Rolando Da Silva Martins, Oporto (PT); Luís Filipe Coelho Antunes, Oporto (PT); Manuel Eduardo Carvalho Duarte Correia, Oporto (PT); Fernando Manuel Augusto Da Silva, Oporto (PT)

(73) Assignees: UNIVERSIDADE DO PORTO, Oporto (PT); INESC TEC—INSTITUTO DE ENGENHARIA DE SISTEMAS E COMPUTADORES, TECNOLOGIA E CIÊNCIA, Oporto (PT)

( * ) Notice: Subject to any disclaimer, the term of this patent is extended or adjusted under 35 U.S.C. 154(b) by 0 days.

(21) Appl. No.: 17/621,040

(22) PCT Filed: Jun. 18, 2020

(86) PCT No.: PCT/IB2020/055748
§ 371 (c)(1),
(2) Date: Dec. 20, 2021

(87) PCT Pub. No.: WO2020/255040
PCT Pub. Date: Dec. 24, 2020

(65) Prior Publication Data
US 2022/0329878 A1 Oct. 13, 2022

(30) Foreign Application Priority Data
Jun. 18, 2019 (PT) .......................... 115587

(51) Int. Cl.
H04N 21/6375 (2011.01)
H04N 21/2187 (2011.01)
(Continued)

(52) U.S. Cl.
CPC ..... *H04N 21/2187* (2013.01); *H04N 21/6131* (2013.01); *H04N 21/631* (2013.01); *H04N 21/6375* (2013.01)

(58) Field of Classification Search
None
See application file for complete search history.

(56) References Cited

U.S. PATENT DOCUMENTS 6,574,795 B1 * 6/2003 Carr ................. H04N 21/454
725/123
8,208,401 B2 * 6/2012 Park ................. H04L 61/5076
370/254
(Continued)

FOREIGN PATENT DOCUMENTS

CA  2805140 C  * 8/2020 ......... H04L 41/5067
CN  101212285 B  * 8/2010 ......... H04L 41/5067
(Continued)

OTHER PUBLICATIONS

Rolando Martins et al., "Iris: Secure reliable live-streaming with opportunistic mobile edge cloud offloading", Future Generation Computer Systems, Dec. 1, 2019.
(Continued)

*Primary Examiner* — William J Kim
(74) *Attorney, Agent, or Firm* — Leason Ellis LLP

(57) ABSTRACT

A novel, pervasive approach to disseminating live streaming content combines secure distributed systems, WiFi multicast, erasure coding, source coding and opportunistic offloading using hyperlocal mobile edge clouds. The solution disclosed to the technical problem of disseminating live
(Continued)

streaming content without requiring a substantial equipment, planning and deployment of appropriate network infrastructure points offers an 11 fold reduction on the infrastructural WiFi bandwidth usage without having to modify any existing software or firmware stacks while ensuring stream integrity, authorization and authentication.

20 Claims, 22 Drawing Sheets

(51) Int. Cl.
*H04N 21/61* (2011.01)
*H04N 21/63* (2011.01)

(56) References Cited

U.S. PATENT DOCUMENTS

| | | | | |
|---|---|---|---|---|
| 2007/0092020 | A1* | 4/2007 | Seki | H04L 1/1845 |
| | | | | 375/267 |
| 2008/0298322 | A1* | 12/2008 | Chun | H04L 1/1635 |
| | | | | 370/335 |
| 2009/0222709 | A1 | 9/2009 | Lin et al. | |
| 2010/0098006 | A1* | 4/2010 | Golitschek Edler Von Elbwart | H04L 1/1854 |
| | | | | 370/329 |
| 2010/0154023 | A1* | 6/2010 | Dey | H04N 21/4402 |
| | | | | 725/151 |
| 2010/0246414 | A1* | 9/2010 | Oksman | H04W 72/0446 |
| | | | | 370/248 |
| 2022/0150872 | A1* | 5/2022 | Park | H04W 92/18 |

FOREIGN PATENT DOCUMENTS

| | | | | |
|---|---|---|---|---|
| CN | 101860900 | A | * | 10/2010 |
| CN | 106954276 | A | * | 7/2017 ........... H04L 1/1812 |
| WO | 2008/038261 | A3 | | 4/2009 |
| WO | 2017/144645 | A1 | | 8/2017 |

OTHER PUBLICATIONS

Abhik Majumdar et al., "Multicast and Unicast Real-Time Video Streaming Over Wireless LANs", IEEE Transactions on Circuits and Systems for Video Technology, Jun. 6, 2002, vol. 12, No. 6.

* cited by examiner

Source Packets

| Header | Header | Header |
|---|---|---|
| Video Data 1 | ... | Video Data k |
| Data Signature | Data Signature | Data Signature |
| Packet Signature | Packet Signature | Packet Signature |

Parity Packets

| Header | Header | Header |
|---|---|---|
| Parity Data 1 | ... | Parity Data m |
| Packet Signature | Packet Signature | Packet Signature |

Erasure Encoding →

FIG. 6

Source Packets

| New Header | Header | Header | Header |
|---|---|---|---|
| Video Data 1 | Video Data | ... | Video Data ¨k |
| Data Signature | Data Signature | Data Signature | Data Signature |
| Packet Signature | Packet Signature | Packet Signature | Packet Signature |

Erasure

Parity Packets

| Header | Header | Header |
|---|---|---|
| Parity Data 1 | ... | Parity Data m |
| Packet Signature | Packet Signature | Packet Signature |

Erasure Decoding

FIG. 7

Table 1: Compression Results

| | CPU (ms) | Space (bytes) | Compression |
|---|---|---|---|
| gzip | 2.8±0.26 | 606.1±1.66 | ~39% |
| 7z | 7.6±0.66 | 644.9±0.20 | ~35% |
| rar | 13.9±2.91 | 708.9±1.97 | ~28% |

FIG. 20

Table 2: Comparison between Different Machine Learning algorithms

|  | Forests | | | Logistics | | | SVM | | |
|---|---|---|---|---|---|---|---|---|---|
|  | C | RAE | RRE | C | RAE | RRE | C | RAE | RRE |
| W.M | 0.85 | 32.1% | 52.1% | 0.19 | 94.1% | 98.1% | 0.07 | 69.3% | 103.5% |
| W.U | 0.99 | 04.8% | 13.0% | 0.73 | 59.7% | 67.5% | 0.71 | 39.9% | 74.2% |
| 4.U | 0.98 | 08.7% | 22.12% | 0.39 | 93.2% | 91.81% | 0.95 | 09.4% | 31.4% |

|  | IBk | | | REPTree | | | NaiveBayes | | |
|---|---|---|---|---|---|---|---|---|---|
|  | C | RAE | RRE | C | RAE | RRE | A | RAE | RRE |
| W.M | 0.82 | 31.7% | 57.1% | 0.81 | 37.5% | 58.5% | 48.7% | 66.5% | 81.4% |
| W.U | 0.98 | 03.2% | 15.4% | 0.96 | 11.1% | 26.6% | 91.2% | 26.3% | 51.8% |
| 4.U | 0.99 | 01.3% | 15.8% | 0.94 | 09.3% | 31.4% | 96.1% | 37.6% | 54.5% |

Table 3: The present disclosure's Complexity

|  | Streaming | | Membership | Key Renegotiation | D2D |
| --- | --- | --- | --- | --- | --- |
|  | Multicast | Unicast | Unicast | Unicast | Unicast |
| Communicating nodes | one-to-all | one-to-one | one-to-one | one-to-one | all-to-all |
| Bit Complexity | $O(1)(best)/O(n)(worst)$ | $O(n)$ | $O(n)$ | $O(n)$ | $O(n^2)$ |

FIG. 23

METHOD AND DEVICE FOR LIVE-STREAMING WITH OPPORTUNISTIC MOBILE EDGE CLOUD OFFLOADING

CROSS-REFERENCE TO RELATED APPLICATIONS

This application is a U.S. National Stage Application under 35 U.S.C. § 371 of International Patent Application No. PCT/IB2020/055748, filed Jun. 18, 2020, which claims priority to Portugal Patent Application No. 115587, filed Jun. 18, 2019, the contents of which are each hereby incorporated by reference in their respective entireties.

TECHNICAL FIELD

The present disclosure relates to a distributed approach that combines a secure distributed network with opportunistic offloading, in particular by using hyperlocal mobile edge clouds. In particular, this disclosure relates to a method and device for live-streaming with opportunistic mobile edge cloud offloading.

BACKGROUND

Current live streaming systems for highly density scenarios try to solve the reliability issue with different approaches. Most of these are commercial offerings so limited information is available. Current full systems solutions that actually have deployable implementations and not simulations, include Cisco's Stadium Vision and Streambolico's system.

Cisco's StadiumVision uses WiFi multicast to deliver live streaming contents to the end-users while using a proprietary FEC solution. Furthermore, no retransmission mechanism is in place. It relies exclusively on the parity and quality of the wireless link to ensure proper video streaming. This solution seems to not allow the selection of the video codec to be used.

Streambolico's solution only offers multicast retransmissions based on source coding to find the best linear combination to be used, thus no FEC mechanism is in place. Unicast is used by the clients to periodically send their reports back to the server. It offers an agnostic approach in regards to the video codec used.

As with Cisco's solution, both do not support any type of edge cloud offloading, multipath, scheduling, mobile data and do not feature security by design, .e.g., stream integrity.

Pullcast focus on using 1-hop P2P mesh networks to support video multicast using WiFi. Contrary to our approach, the infrastructure only ensures the multicast stream from the backbone. It is up to the local mesh the possible recovery of the missing packets. Since major vendors, such as Extreme Networks, impose a limit on the output queue for multicast track on their APs, it is common for some multicast packets to be dropped at the AP.

Moreover, if none of the nodes within the mesh has a particular packet, then the recovery is impossible, and within their mesh network, they use unicast to perform retransmissions. However, they abstract the P2P connections, so no true D2D communications are used/simulated.

Video streaming over wireless networks using multicast and unicast but at the IP layer is addressed by A. Majumda, et al. This presents a novel hybrid Automatic Repeat reQuest (ARQ) algorithm that merges FEC with the ARQ protocol for unicast streaming and offers an approach that uses FEC for multicast progressive video coding based on MPEG-4 FGS. This solution is not able to make use of higher level communications frameworks provided by mobile devices without requiring a non-trivial amount of refactoring of mobile operating systems and operates under a time-window (grouping), with acknowledgments being sent after this grouping was successful received, with sources packets being sent ahead of potential FEC packets. If no losses happen during the transmission of source packets, then no parity are sent (since no packets were lost).

Alternatively, the approach taken in DiCoR addresses the problem of 3G video streaming (through broadcasting), namely, the offloading of retransmissions traffic from 3G via a cooperative out-of-band P2P repair (CPR) algorithm that uses IEEE 802.11 ad-hoc. It assumes that all the nodes present in the $P_2P$ mesh are altruistic and do not deviate from the specified implementation of DiCoR. As in A. Majumda, et al., if a packet is not available in the P2P then there is no way to recover it (and no convergence will happen), however there is a suggestion to the use of explicit retransmissions by forcing 3G usage (although not presented or simulated).

Lastly, DiCoR avoids using FEC as they argue that the feedback associated with the reporting from clients can potentially lead to a feedback implosion (as we also confirmed). However, the present disclosure circumvents this problem by a compact representation of pending packets, even in the presence of high packet loss.

PeerCast [42] uses a centralized cooperative approach for 802.11-based WLANs. The main assumption is that channel capacity for wireless networks, namely for multicast, is hampered by the presence of clients associated with low data rates. Instead of falling back to lowest data rate to allow the reception from a higher number of clients, it uses the highest data rate possible to increase throughput, and uses packet relaying to compensate for the packet loss. To achieving this relay, a subset of high data rates nodes is selected to forward the data to other strategically placed nodes or weaker nodes.

The present disclosure also shares some common ground with PeerCast, since it also makes use of relaying, albeit integrated with additional recovery mechanisms, i.e., FEC, interleave and scheduling. However, the disclosed system and method do not opt for the highest data rate possible, since by our experience this has a compound effect on packet losses. Instead, we make judicious use of multicast bandwidth for both video streaming and retransmissions. Additionally, we operate at the application layer to make use of all possible D2D communications off-the-shelf, without requiring any modification to the network stack, as opposed to PeerCast that operates at the link layer, requiring modifications to the OSes.

D. Jurca et al, provides a theoretical approach for low-level multipath support through the use of several scheduling strategies that uses video streaming as an application case. Regarding security aspects, it addresses a secure schema for P2P but it does not consider multicast trac. It uses keyed-hash message authentication code (HMAC) for integrity that renders it not suitable for the present scenario.

To the extent of our knowledge, none of the aforementioned systems seamlessly integrate reliable multicast, security, stream integrity and edge cloud offloading.

GENERAL DESCRIPTION

The present disclosure allows to use a sophisticated approach using a dual interleaved mechanism that uses channel monitoring to adjust parity on-the-fly, that minimizes the impact of latency, hereby referred as the Iris.

Moreover, the disclosure uses a compact representation, that makes use of compression, to represent missing packets on our acknowledgment mechanism. Instead of using full sequence numbers, the present disclosure uses bitmaps for space saving.

It is disclosed an alternative approach to A. Majumda, but it could easily make of mobile data as the main communication channel, and then use alternative communication channels, e.g. WiFi, Bluetooth, to recover packets. As of now, we have built-in explicit retransmission that is triggered once a number of retries or a time threshold is passed, to force the use of mobile data, if allowed/present. To be noted, that this is completed integrated into our modular scheduling framework, and the behavior can be easily adjusted.

The disclosed system and method allow to use a double signature schema for non-repudiation and FEC support, in tandem with symmetric key rotation for ensuring forward secrecy. Additionally, the disclosed method could potentially have federated authentication, where neighbours share an exclusive encryption schema, i.e., that is independent of the backend OAuth (although maintaining the double signature schema for non-repudiation). This allows independent symmetric keys to be used, that could be used to minimize leeching behaviour from nearby non-cooperating devices.

It is disclosed a computer-implemented system for live-streaming video over a multichannel wireless network or networks, comprising at least one streaming server connected to a plurality of mobile user devices as streaming clients, wherein the streaming server comprises:
  a stream handler for obtaining data packets from a received video live-stream, and a network scheduler for scheduling the transmission, and retransmission when deemed necessary by the streaming server, of transmission data packets and retransmission data packets, respectively;
  wherein the streaming server is arranged to FEC, Forward Erasure Correction, encode the obtained data packets to transmission data packets for transmission to the streaming clients;
  wherein the multichannel wireless network or networks comprise a plurality of wireless channels wherein said channels comprise two or more distinct wireless technology types;
  wherein the network scheduler comprises a sub-scheduler for each wireless channel and is arranged such that:
  transmission data packets are scheduled for transmission by a first sub-scheduler;
  transmission packets that are determined as missing at the first sub-scheduler are scheduled for retransmission at the first sub-scheduler;
  retransmission packets that are determined as missing more than a predetermined number of times at a particular sub-scheduler are passed to a subsequent sub-scheduler.

In an embodiment, the streaming server is arranged to encode a transmission matrix by:
  placing transmission packets in a predetermined number of rows and a predetermined number of columns using row-major order until waiting until the transmission matrix is full;
  calculating an erasure encoding parity for each column and adding the calculated column parity at the end of the respective column at one or more matrix blocks to form one or more column parity rows;
  calculating an erasure encoding parity for each row, including the calculated column parity rows, and adding the calculated row parity at the end of the respective row at one or more matrix blocks to form one or more row parity columns, such that blocks belonging for both row parity data and column parity data are row parity over column parity data;
  transmitting the matrix in column-major order.

In an embodiment, the FEC encoding is runtime adjustable by dynamically adjusting the number of parity rows and the number of column parity rows.

In an embodiment, the parity is calculated using a Reed-Solomon coding method.

In an embodiment, the streaming server is arranged to not retransmit parity packets.

In an embodiment, each streaming client is arranged to report packet reception by transmitting a reception report to the streaming-server to which it is connected, the number of the last transmission matrix that was fully received followed by a bitmap representation of each of the outstanding transmission matrixes, wherein a 0 encodes a missing packet and a 1 otherwise, or vice-versa.

In an embodiment, the bitmap representation is compressed using a lossless image compression method, in particular a gzip compression method.

In an embodiment, each streaming client is further arranged to report packet reception by transmitting the reception report through each of the wireless channels, wherein the reception report for each wireless channel also comprises the respective RSSI, received signal strength indication, and used wireless technology type.

In an embodiment, the network scheduler is arranged such that retransmission packets that are determined as missing more than a predetermined number of times at a last sub-scheduler are discarded or looped-back to the first sub-scheduler.

In an embodiment, each sub-scheduler comprises a filter for filtering out packets to be excluded from retransmission.

In an embodiment, the filter comprises a machine-learning classifier for predicting packet loss ratio for unicast transmission and for predicting the bitmap layout of the transmission matrix for multicast transmission, for excluding packets from retransmission.

In an embodiment, the same machine-learning method is used for both unicast and multicast, in particular the machine-learning method being a Random Forest machine-learning method, Reinforcement Learning machine-learning method, or a combination thereof.

In an embodiment, the FEC encoding is AL-FEC, application-level FEC, wherein the FEC encoding is operated within the application layer. Typically, layers in a network comprise a physical layer (e.g. cable, RJ45), a data link layer (e.g. MAC, switches), a network layer (e.g. IP, routers), a transport layer (e.g. TCP, UDP, port numbers) and an application layer (e.g. SNMP, HTTP, FTP).

In an embodiment, the transmission packets and retransmission packets are transmitted over UDP.

In an embodiment, the streaming clients are arranged to receive the live-streaming video and request and receive retransmitted data packets at the application layer.

In an embodiment, the wireless technology types include local area wireless network such as wifi, and broadband cellular mobile phone network such as 3G, 4G or 5G.

In an embodiment, the multichannel wireless network comprises a multicast wifi channel of a local area wireless network, a unicast wifi channel of a local area wireless network, and a unicast mobile network channel of a broadband cellular mobile phone network.

In an embodiment, the wireless channels further comprise a multicast mobile network channel of a broadband cellular mobile phone network.

It is also disclosed a system comprising opportunistic network edge offloading, wherein the streaming clients are arranged to:

periodically request missing packets from all available neighbouring streaming client using a mesh connection.

In an embodiment, neighbouring streaming clients are connected by WiFi Direct or Bluetooth BR/EDR (Classic Bluetooth) or both.

In an embodiment, all transmitted and retransmitted packets are digitally signed, whether as grouped or individually, in particular using elliptic curve cryptography signature.

In an embodiment, the packets are signed individually by the packet sender and signed as group within a chunk of vide by the video stream creator.

In an embodiment, the signature is obtained by independent symmetric keys.

An embodiment comprises a plurality of said streaming servers, each streaming server arranged to transmit to a specific geographical section which is distinct of the geographical sections of the other streaming servers, in particular the specific geographical section not overlapping the geographical sections of the other streaming servers.

In an embodiment, the streaming server is arranged to encode a source coding for retransmission data packets for transmission to the streaming clients, using a linear combination of packets to overcome missing packets at the streaming clients.

In an embodiment, packets that are not required because of the FEC encoding are not to be retransmitted and are not included at source coding.

In an embodiment, the source coding is interleaved for dual-interleaved communication.

In an embodiment, the streaming client is arranged to provide an Extend Real-Time Messaging Protocol (RTMP) replacement.

BRIEF DESCRIPTION OF THE DRAWINGS

The following figures provide preferred embodiments for illustrating the description and should not be seen as limiting the scope of invention.

FIG. 6: Schematic representation of an embodiment of the double signature schema.

FIG. 7: Schematic representation of an embodiment of the recovering a lost packet.

FIG. 20: Table of compression results.

FIG. 21: Table of a comparison between different Machine Learning algorithms.

FIG. 22: An example of the execution of a source coding algorithm.

FIG. 23: The present disclosure's Complexity.

DETAILED DESCRIPTION

Figure 1:
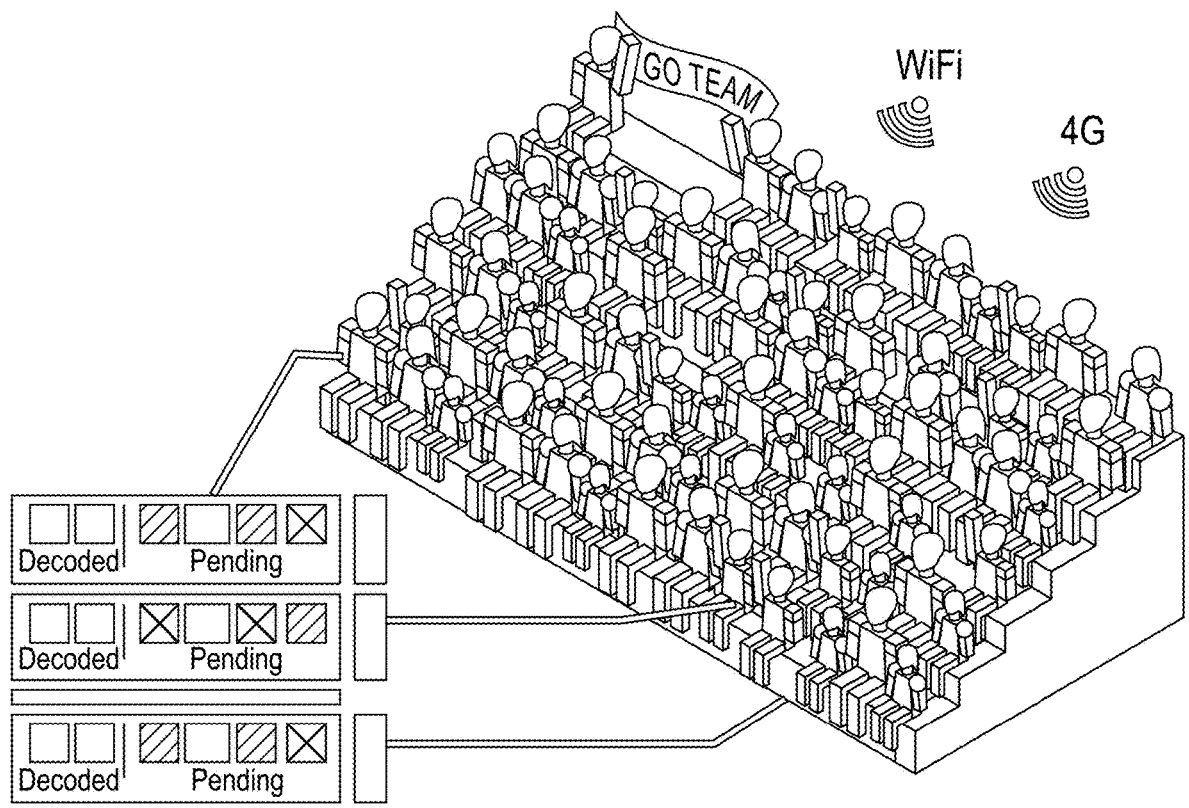
FIG. 1: Shows a schematic representation of an embodiment of the streaming over a stadium section.

There is a real-world problem faced across high density environments, such as stadiums, arenas, concert halls, and museums, concerning the increasing demand for more bandwidth and lower latencies over WiFi for highly interactive mobile applications, especially regarding live video streaming.

The cost to provide wireless coverage that includes both Distributed Antenna Array (DAS) and WiFi for a large stadium reached approximately $18 million USD in 2016. Albeit the best efforts from network vendors to provide seamless wireless coverage, random sources of interference, and even user behaviour, can create havoc on user experience.

As a response to these problems, Telcos and wireless vendors are actively pursuing more decentralized solutions, such as 5G, in an effort to increase network coverage and throughput. Simultaneously, the search for alternative approaches to centralized solutions, as a way to avoid single-point-of-failure has led to a renewed interest on edge computing.

Furthermore, the ever-increasing adoption of mobile devices is raising interest on the potential exploration of the untapped resources that these devices hold. The societal impact can be easily perceived as the crowdsourcing of these devices can easily create alternative networking options in scenarios where traditional infrastructural, e.g. 802.11n APs (Access Points) and LTE/4G base stations, options are limited, unavailable or commercial nonviable.

Large (commercial and educational) wireless deployments indicate that network vendors are extremely conservative regarding modifications to their products, so any changes to the infrastructure are not necessary according to the present disclosure, as this would limit the applicability of the present solution.

When using 4G data, the disclosed system and method endeavor to make judicious use on bandwidth usage as it may have potential costs to the end user (a user is free to block the use of mobile data).

In an embodiment to better results the disclosed system and method leverages AP bandwidth usage, security, latency and reliability, while aiming to ensure Quality of Experience (QoE) to end users. In order to ensure reduced latency and reliability of the streaming, sometimes bandwidth savings have to be forgone, i.e., a user seated in a low WiFi coverage spot, to ensure a better user experience.

Users disengage if the stream is paused for more than e.g. 5 seconds. With that in mind, the present disclosure aims to provide a latency below this upper limit. Since we are not modifying any software stacks, both in the wireless infrastructure and mobile devices, the introduction of a new transport protocol was not considered. In order to ease adoption by users, the described solution is built entirely at the application layer.

Extend Real-Time Messaging Protocol (RTMP) was replaced by the disclosed system and method. This allowed to strip down the complexity while adding more flexibility to accommodate edge clouds and multiple wireless paths (802.11n and 4G). However, it is entirely feasible to incorporate our solution into RTMP.

The existence of a trusted entity that provides curated video streams and enforces security is assumed according to an embodiment. Because broadcasting rights can be in place, the need for a digital rights DRM enforcing mechanism is also assumed according to an embodiment. The DRM protocol only provides enforcement at the network level. It is considered out-of-scope of the present disclosure the engineering to secure the media player, such as the use of ARM's TrustZone, which can be carried out using prior art disclosures.

In an embodiment, an Android implementation (based on vanilla Android) can be used because it is an open platform that allows for more flexibility, although the design supports both Android and iOS operating systems.

In an embodiment, the WiFi Asymmetric Half-Duplex Links can be considered: Mobile devices have substantial less radio capabilities, and this is further exacerbated in the upstream link. This can be easily explained by the power constraints in these platforms, where less power available is available to wireless radios. In contrast, access points have substantially more powerful wireless radios making downstream communication more efficient. Given this limitation, upstream bandwidth is limited, and its use must preferably be conservative.

In an embodiment, the Partial Multicast Support from Mobile OSes can be considered: Supporting multicast in mobile operating system is currently suboptimal. Certain devices do not properly support IGMP, e.g., Google Nexus 5 only supports IGMP v6 due to a bug in the kernel compilation process. Others only offer partial support, such as Apple's iPhone 5 (among others), which does not support IGMP query responses. Ultimately, multicast alone is not sufficient to ensure data transmission and thus other mechanisms must be in place as a fallback.

In an embodiment, the Burst Packet Loss can be considered: the disclosed system and method assume that no multicast-to-unicast conversion is performed at the AP. Additionally, wireless networks using multicast tend to be affected majorly by burst packet loss.

In an embodiment, the User Behavior can be considered: From a behavioral standpoint, the disclosed system and method assume that users will preferably not move when streaming. This makes the problem somewhat more tractable, as it isolates our solution from some low-level network issues, such as WiFi handovers. This is also a realistic assumption if in the present specific case assume that most users will only stream while seated/standing, e.g., intermissions, or while waiting nearby points of interest, such as (food) concession stands, i.e. movement will be limited to a certain degree.

In an embodiment, a mobile edge cloud deployment can be considered: The deployment of edge clouds and the way the meshes are constructed is preferably strictly controlled by the entity hosting the system. This requirement arises from the need to control the radio frequency (RF) environment. In some scenarios, the added interference brought by Bluetooth and hotspots can potential be harmful for already deployed services, e.g. legacy closed-circuit television (CCTV) may malfunction with additional contention over the RF spectrum.

The following pertains to the improvements on the current state-of-the-art.

In an embodiment, the Runtime Adjustable AL-FEC Schema can be considered: Given bursty packet loss exhibit by WiFi, in particular for multicasting, an adjustable FEC mechanism that makes uses of transmission interleave to increase AL-FEC (Application Level Forward Error Correction) efficiency was designed. A common-of-the-shelf and thoroughly tested block erasure coding algorithm is used, specifically Reed-Solomon, although others can be used. The level of redundancy is adjusted on-the-fly to better face changing network conditions using a sliding window-based algorithm.

In an embodiment, the Efficient Client Reports can be considered: To circumvent the asymmetry of upload links, in particular in 802.11, a space efficient ack/report mechanism was designed, leveraging compression algorithms that, if useful, will also act as a heartbeat for the server's membership management.

In an embodiment, the Multipath Scheduler Framework can be considered: The described solution backend scheduling allows sub-schedulers (one per communication primitive, e.g. WiFi multicast or 4G unicast), can be rearranged towards fulfilling a specific deployment need. For example, if WiFi multicast is not available then we can simply configure the pipeline without the multicast stage.

Furthermore, historical information and client reports are used to create a predictive service for better estimating packet loss. Contrary to other approaches that use statistical models, the described disclosure can be made use of a supervised machine learning algorithm, namely Random Forest, to achieve better bandwidth usage and reduce missed deadlines.

In an embodiment, the Security and Integrity can be considered: Public key infrastructure (PKI) are used as the basis for a secure infrastructure. The current approach only allows performance attacks, up to a certain point. If a device experiences packet drops either because it is not receiving sufficient multicast streaming and/or retransmissions it fallbacks and requests a new position within the edge cloud. Stream integrity is assured at all times, even in the presence of malicious devices.

A double signature schema that enforces integrity was designed, authentication and non-repudiation over network packets and video chunks. Each single packet is digitally signed by either the trusted server or an edge cloud node to ensure that the sender is authorized, whereas a valid video chunk must be signed by the trusted server. For ensuring confidentiality, we make use of rotating symmetric keys to encrypt data payloads. This trusted infrastructure offers security-as-a-service in order to support seamless authentication and authorization for edge clouds.

In an embodiment, the Mobile Edge Cloud Offloading can be considered: Through the crowdsourcing of mobile devices, a novel approach to support opportunistically offloading is offered. This makes use of all device-to-device (D2D) technologies presently available in Android OS, namely Bluetooth [16] and WiFi-Direct [17], to create edge clouds.

Figure 2:
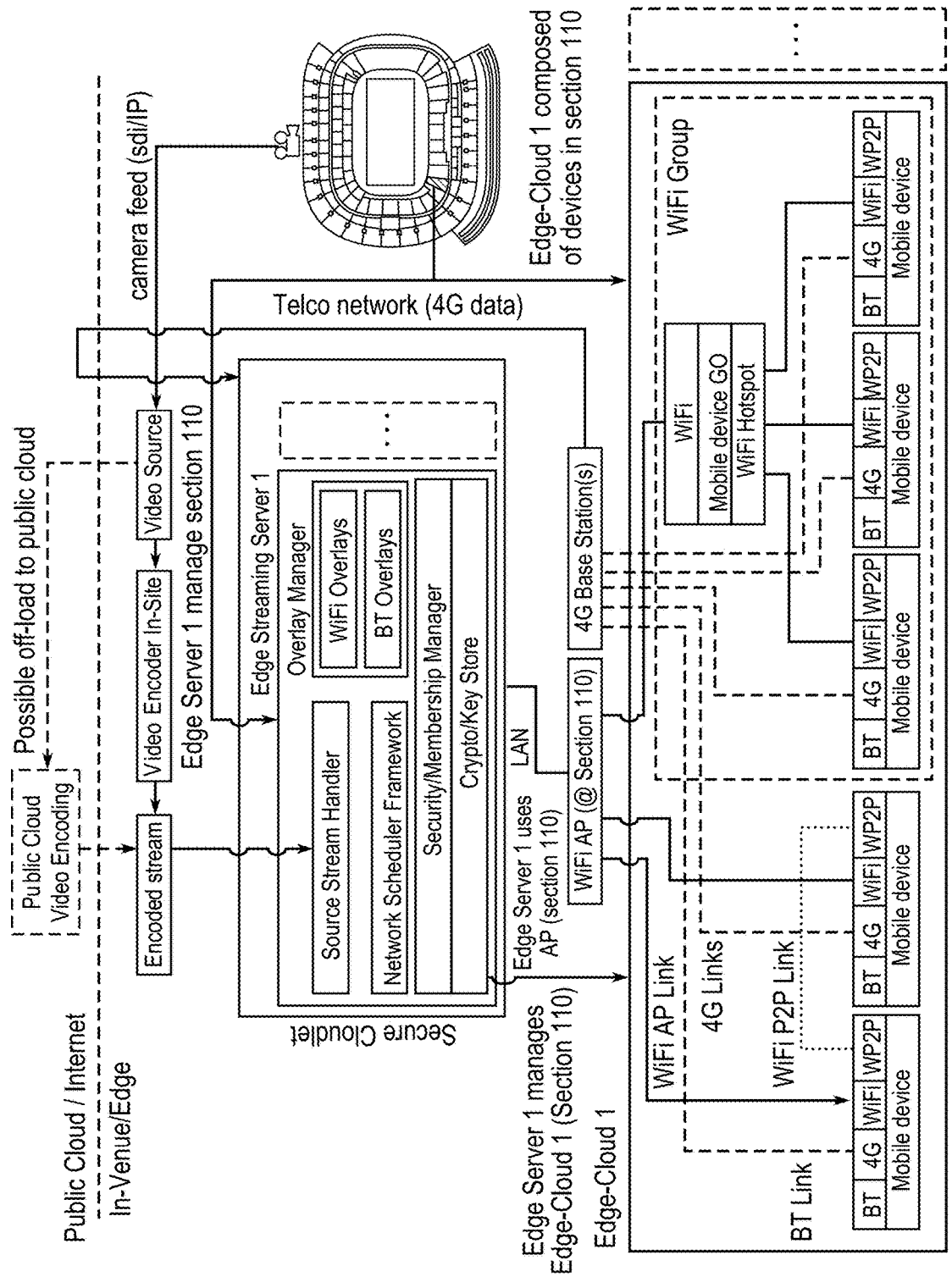
FIG. 2: Illustrative representation of an embodiment of the' System Overview.

In an embodiment, the architecture can be considered the schematic representation of the overall architecture of the present disclosure depicted in FIG. 2. While the architecture described below reflects a single section, for the sake of clarity, the present approach can scale horizontally as needed.

The video originated from an in-venue camera is encoded from its raw format, normally using a SDI interface, to either H265 (or H264). This encoding can be performed by an in-venue encoder, using software or hardware, or it can be shipped to the cloud (shown as dashed lines). The final encoded stream is then injected in the edge streaming servers.

Each section is supported by an edge streaming server (which can be deployed as a micro-server in a container pool), and the aggregation of these form a cloudlet. The need to use edge servers derives from the requirement to lower latency, namely on packet retransmissions, whereas the actual video encoding can be performed at the cloud.

In FIG. 2, it is depicted that stadium section 110 is handled by the edge streaming server 1. This server is responsible for supporting the (secure) video streaming, using WiFi and 4G, for that particular section. The use of edge clouds is not mandatory, but if used are governed by the streaming server that oversees that particular section. In the given example, the edge streaming server 1 handles edge cloud 1, which is formed through the crowdsourcing of the devices present in stadium section 110. Furthermore, each section is served by WiFi and potentially 4G. For WiFi, we can use unicast and potentially multicast, while for 4G we are limited to unicast, although there are several Telcos that are presently conducting field tests in order to assess the deployment of multicast on top of 4G. The present disclosure can make immediate use of this technology once it becomes available for general use.

In an embodiment, the method of the present disclosure may comprise a streaming server.

An edge streaming server is preferably responsible for handling a single section (or a portion of the overall space). Within each server there is a "Source Stream Handler", that handles the incoming encoded video stream, a "Network Scheduler Framework" that handles the scheduling of the multichannel streaming and retransmissions, a "Overlay Manager" that oversees the different mesh overlays (one for each type of technology), and lastly, a "Security/Membership Manager" that offers Security-as-a-Service for handling both the encryption of the streaming and the necessary authentication and authorization (including the support for secure tokens for the edge clouds).

In an embodiment, the method of the present disclosure may comprise a source stream handler.

This handler buffers incoming encoded MPEG-TS segments (for example, 188 bytes at a time), from either the in-venue encoder or from a encoder hosted in a public cloud. These segments are then aggregated in groups using a predefined threshold (that is preferably below 802.11n RTS (Request to Send)), which normally entails 11 segments but it is dependent on the configuration of WiFi.

Due the unreliable nature of UDP and the "bursty" packet lossy behavior of 802.11n, namely when multicast is used, erasure coding was chosen to pro-actively add redundancy to the streams, thus promoting fewer retransmissions. Obviously, more redundancy will inherently result in more bandwidth consumption; alternatively, less redundancy can potentially result in more retransmissions.

In an embodiment, the Adjustable Forward Error Correction can be considered in the present disclosure.

In an embodiment, the method of the present disclosure may choose to use Reed-Solomon (RS) as our erasure coding algorithm due to its efficiency for both encoding and decoding for a small number of erasures. However, it is rather straightforward to adopt a different algorithm in the present architecture. The only restriction is that it is advisable to have a maximum distance separable (MDS) code, so that any combination of errors and erasures can be recovered, up to the number of erasures used. This is a requirement of the present packet interleave mechanism.

Figure 3:
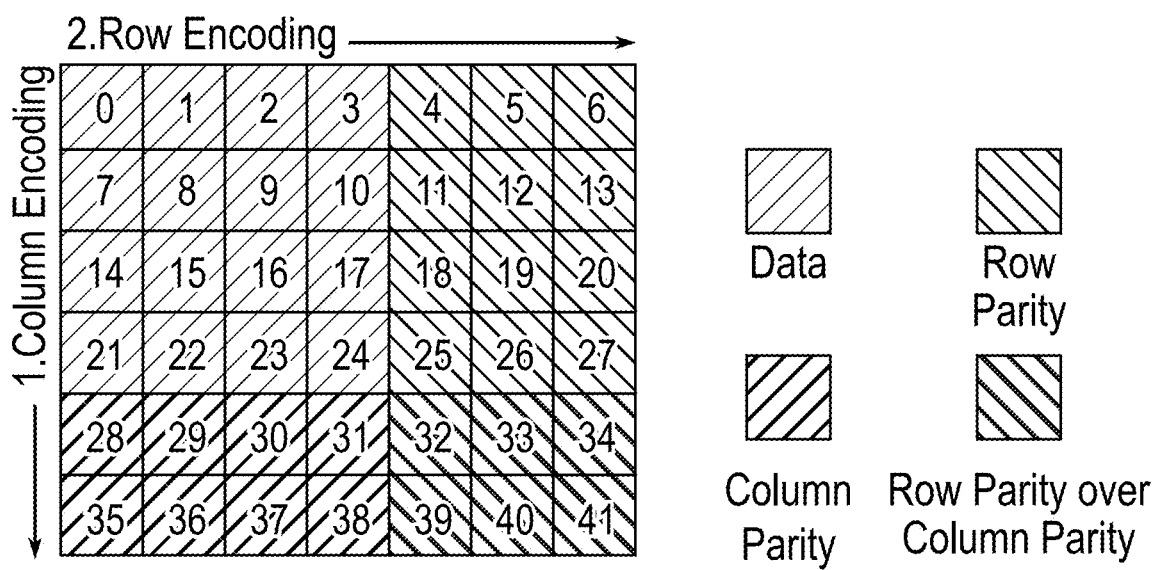
FIG. 3: Schematic representation of the transmission Matrix.

In order to improve efficiency, a novel erasure encoding schema was introduced, that is closely tied to the present transmission strategy. For actually performing the encoding, first a transmission matrix is constructed, as shown in FIG. 3. The source data (original packets) used by the erasure encoding is provided by the "Source Stream Handler". After it creates sufficient data packets (from the received video segments) to fill a transmission matrix, then the actual erasure encoding of matrix takes place.

The first phase encodes all columns, followed by the second phase that encodes all rows, including the rows generated in the previous step as column parity. This offers novel adjustable parity and diagonal parity packets (row parity over column parity, i.e., the darkest colored packets in FIG. 3).

In an embodiment, the Network Scheduler Framework can be considered in the present disclosure.

Figure 4:
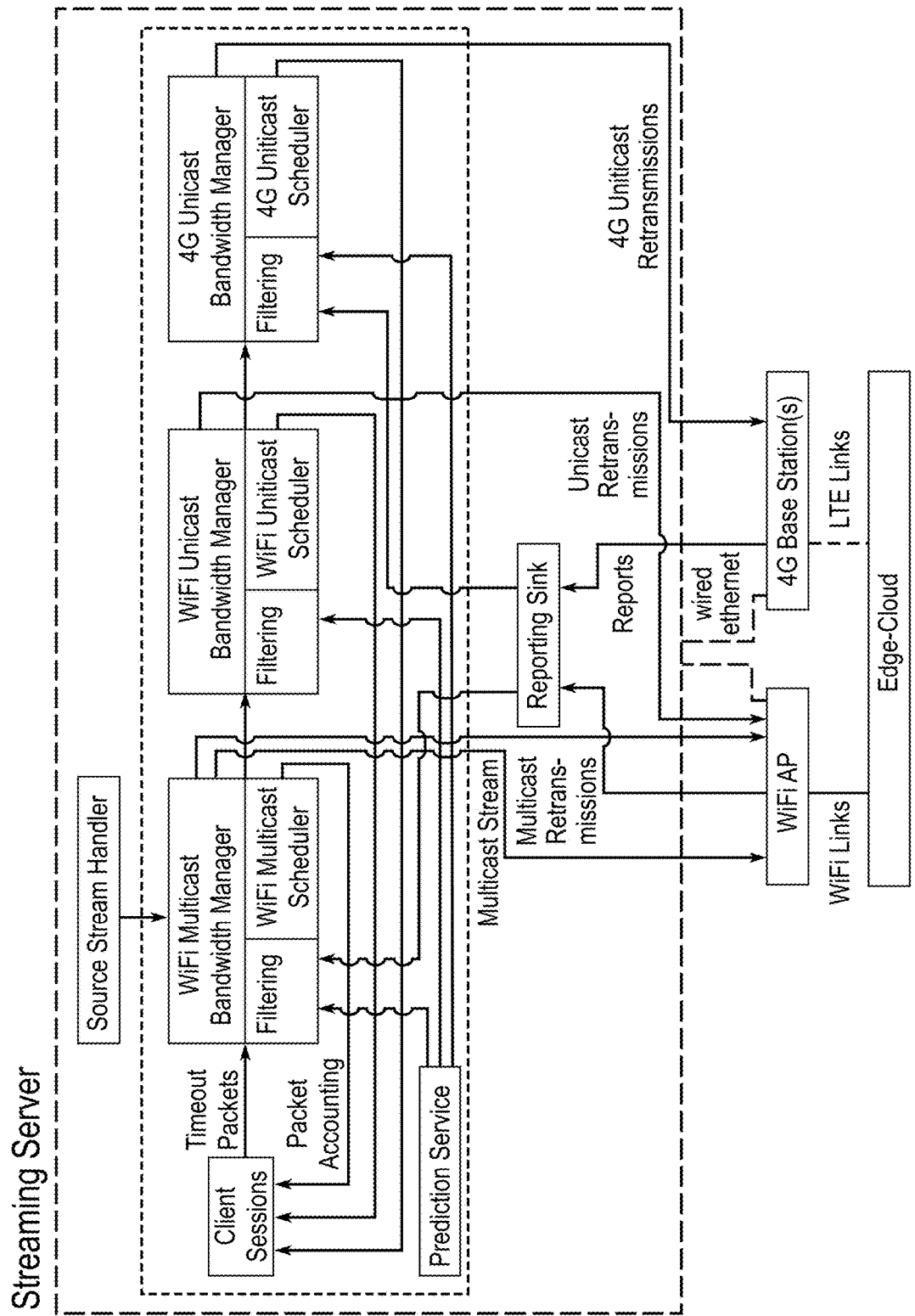
FIG. 4: Schematic representation of an embodiment of the network Scheduler Framework.

In an embodiment, the present network scheduling framework, depicted in FIG. 4, handles the base multicast stream, shown as an arrow between the Wifi Multicast Bandwidth Manager and the WiFi AP, which is then complemented with the necessary retransmissions to compensate the missing packets for each faulty client.

It uses a composition of sub-schedulers following a pipeline style, where each stage, i.e., sub-scheduler, can potentially retransmit outstanding packets. All the packets that could not be retransmitted at a particular stage are forwarded to the next sub-scheduler of the pipeline, with the exception of the tail, where packets can either be rescheduled (looped back), for future retransmission, or discarded, dependent on the strategy used.

The layout of the pipeline is modular, in the sense that modules can be rearranged to fulfill a particular retransmission strategy, although the present solution considers the layout featuring WiFi multicast, WiFi unicast and 4G unicast sub-schedulers, in this specific order. This configuration allows to minimize the burden imposed on 4G links, and thus avoiding potential high data costs for end users, while respecting the present limitations of using WiFi networks, specially those related to high density scenarios.

Each sub-scheduler features a bandwidth manager and a filtering component. The first serves as a bookkeeper for the bandwidth used, either globally (multicasting) or individually per client (unicasting). Whereas, filtering is used to exclude packets that do not meet a specific set of criteria, i.e., the prediction service of the present solution was used to dictate which packets should be filtered out but also other heuristics were imposed such as limiting the number of times a packet is considered for multicast retransmissions (as a way to divert more multicast bandwidth towards more recent packets). The client's sessions are maintained globally and are the placeholders for all the information regarding the clients. The clients acknowledge their current packet reception through periodically sending reports to their streaming server (which is internally handled by the network scheduler). These reports contain a representation of the pending transmission matrices (the ones that still have missing packets) and are further explored below.

In an embodiment, the space efficient client reports can be considered in the present disclosure.

The asymmetry of wireless links, where upstream links have substantial less bandwidth, requires a lightweight acknowledgment approach. Alongside this issue, some mobile OSes, namely iOS, have small buffers in their network stack that once filled causes the application to enter an erroneous state where is not possible to recover from, except by forcing the restart of the application.

In an embodiment, the disclosure does not use standard positive (ack) or negative acknowledgments (nack), since they impose a significant higher bandwidth requirements, with the first requiring an ack for every received packet, whereas the latter requiring a nack for every packet loss detection.

Figure 5:
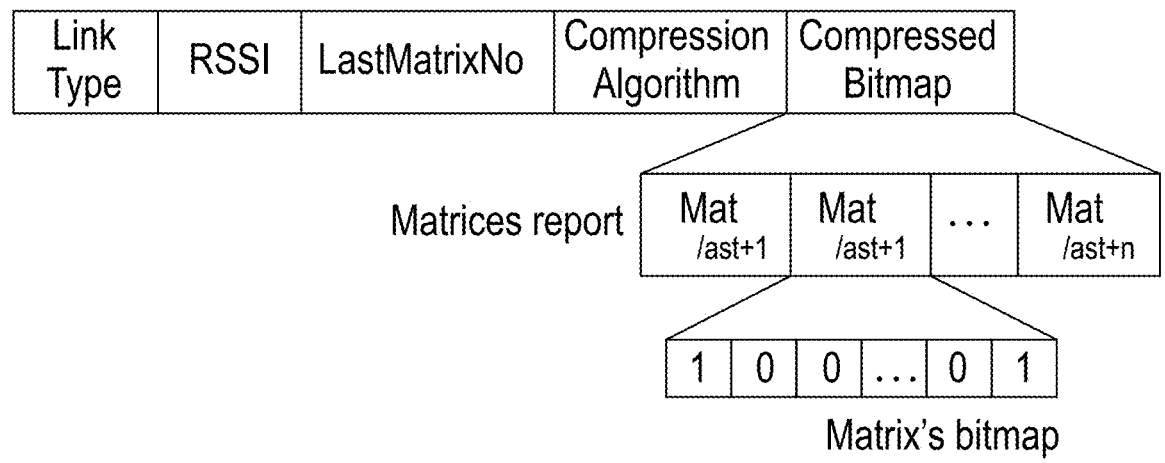
FIG. 5: Schematic representation of an embodiment of the feedback report data structure.

As an alternative to standard acknowledgments techniques, a periodic acknowledgment strategy that uses bitmap for space efficiency was implemented, as depicted in FIG. 5. When compared, the present disclosure requires less bandwidth at the expense of a somewhat higher, although adjustable latency.

The first field of the packet indicates the type of link (WiFi or 4G). This is followed the RSSI (received signal strength indication) value. The third field is the last matrix number that was dispatched (which all the necessary packets where received or a timeout occurred), followed by the compressed bitmaps of all outstanding matrices (of which we use 0 to encode a missing packet and 1 otherwise).

These client reports are sent to both the WiFi and 4G reporting sinks and are fed to the sub-schedulers to be used in their pre-processing filtering.

For the actual compression we used gzip, as it offered the best compression ratio, and used less CPU, for our particular data structure among the ones we tested, namely 7z and rar. Table 1 in FIG. 20 illustrates that presenting average and 95% confidence interval, were produced by running 10 times each compression algorithm, using an Intel Core i7 6700HQ CPU, against 10 different acknowledgment packets (with fixed size of 990 bytes).

In an embodiment, a prediction service can be considered in the present disclosure.

Machine learning (ML) was used to create a prediction service that allowed to predict potential packet loss over a specific transmission primitive (WiFi multicast, WiFi unicast or 4G unicast). With this in place, we can effectively reduce the overall bandwidth consumption as we avoid wasting network bandwidth, and in the case of multicast source coding, we can better optimize the linear combinations of the retransmission's packets.

The integration of the prediction service is achieved at the "Filtering" sub-component, for each sub-scheduler.

Three distinct classifiers for handling WiFi multicast were constructed, WiFi unicast and 4G unicast, separately (one for each available sub-scheduler), while having considered the following attributes: rssi, Received Signal Strength Indication; clients, number of active clients; cols, the number of columns in the transmission matrix; rows, the number of rows in the transmission matrix; m, row parity; z, column parity; report, client's report. The clients attribute is only considered for WiFi, as we do not have the number of clients that are connected to a specific mobile base station.

For multicast, the idea is to use the report attribute to predict the layout of next transmission matrix. The matrix is projected into a single numeric value, where each bit represents if the packet is present or not (following the same approach used in the feedback reports depicted in FIG. 5, namely the layout of the transmission matrix bitmaps). Whereas for unicast, the report attribute represents the packet loss ratio.

The training datasets used to build the classifiers were collected by logging network statistics during runs with the prediction service disabled.

The following algorithms were considered: Logistic Regression (Logistic); Classification and Regression Trees (REPTree); k-Nearest Neighbors (IBk); Support Vector Machines (SVM); Random Forests (Forests); and Naive Bayes. A comparison between these different Machine Learning algorithms is shown in Table 2 in FIG. 21.

For this experiment, a 10 fold cross-validation was performed against these algorithms for WiFi Multicast (W.M), WiFi Unicast (W.U) and lastly, 4G Unicast (4.U). As metrics, we selected Correlation (C), Relative absolute error (RAE) and Root relative squared error (RRE). For Naive Bayes, correctly classified instances (A) is shown instead of correlation, since we had to convert the numeric attributes to nominal representation.

Random Forests was settled as the ML algorithm, since it offers better prediction for WiFi Multicast while offering almost similar performance for unicast when compared to IBk. Optionally, the prediction service may allow reinforcement learning, where each streaming service injects the monitoring data which it is collecting from the devices' acknowledge reports.

In an embodiment, the WiFi Multicast Network Sub-Scheduler can be considered in the present disclosure.

The described disclosure takes advantage of the broadcast nature of multicast and used it to perform the video streaming, targeting the obvious bandwidth savings. Thus, besides taking care of the multicast retransmissions, the WiFi multicast sub scheduler also sends the "base" stream, which is then followed by retransmissions rounds to recover missing packets.

Instead of relying solely on retransmissions to recover from missing packets, the present solution proactively uses FEC as a way to add redundancy to the stream. Since the parity packets are being broadcasted, the described solution can effectively minimize the overhead on bandwidth usage, i.e., as opposite of using FEC in unicast streams, where the costs linearly increase with the number of clients.

Instead of having a fixed configuration for the amount of parity used, for both row and column parity packets, a runtime adjustable forward error correction was implemented, as shown in Algorithm 1, that dynamically adjusts the amount of redundancy to better meet current network conditions.

| Algorithm table 1 - Runtime Adjustable FEC Algorithm. |
| --- |
| var: session // multicast session |
| var: slidingWindow // sliding window containing clients' reports |
| var: historic // FEC historical information |

```
1     procedure DynamicFEC (session, slidingWindow, historic)
2       windowTraffic ← slidingWindow.getTraffic ( )
3       currentParity ← session.getFEC ( )
4       historic.setTraffic (currentParity, windowTraffic)
5       bestParity ← (0, 0)
6       minTraffic ← MAXLONG
7       rowParity ← 0
8       while rowParity ← MAX_ROW_PARITY do
9         colParity ← 0
10        while colParity < MAX COL PARITY do
11          traffic ← historic.getTraffic (rowParity, colParity)
12          if traffic < minTraffic then
13            bestParity ← (rowParity, colParity)
14            minTraffic ← traffic
15          end if
16        end while
17      end while
18      session.setFEC (bestParity)
19    end procedure
```

This algorithm creates a history about past configurations and uses that information for the selection of the amount of parity to be used. It operates under a time sliding window, where reports are collected from all the active users (line 2). After updating the historic data regarding the current configuration (lines 3-4), it searches for the best configuration within the historical information (lines 5-17), and finally updates the amount of parity to be used in the multicast streaming (line 18).

Our encoding schema is tightly coupled with both our packet interleave strategy and transmission ordering, as a way to maximize FEC efficiency in WiFi environments, which are dominated with bursty packet loss.

In an embodiment, the following packet interleave & transmission ordering can be considered in the present disclosure.

An adjustable interleaved scheme was adopted, as shown in FIG. 3, that handles both bursty and random packet loss behavior to accommodate different loss patterns. In order to increase error correction efficiency, we transmit a transmission matrix by column and not by row; using the example FIG. 3, the order in which the packets are sent is {0, 7, 14, 21, 28, 35, 1, 8, 15, . . . }. With this strategy we can spread packet loss across multiple rows.

However, this approach does not handle random packet loss, which has been addressed by us through the introduction of column parity. By now, it should be clear that if we increase column parity then we are adding more protection against random packet loses, and adding more row parity will provide more protection for bursty packet loss.

In an embodiment, the following WiFi multicast retransmissions can be considered in the present disclosure.

The WiFi Multicast retransmission algorithm of the present disclosure is based on the concept of source coding. While inspired by previous heuristics, it offers a novel approach that has FEC awareness that is able to accommodate the prediction service while offering bandwidth control over the maximum amount of multicast bandwidth to be used. Its design was driven by the limitations of the underlying medium, more specifically the relative low amount of multicast bandwidth (over 802.11) for retransmissions, and the need for fast processing to ensure low latency (to avoid missing retransmissions deadlines). Our implementation ultimately targeted speed at the expense of some accuracy, i.e., by not overcoming possible local minimas.

Prior to running the present description's source coding algorithm, the network coding (NC) matrix containing the packet information of each client was constructed. All the reports sent periodically by each client are collected.

Each line reflects the state of a single client, whereas each column indicates the state of the packet, which can be PACKET MISSING (packet is timeout and needs retransmission), PACKET AVAILABLE (packet was already acknowledge), PACKET NOT AVAILABLE (packet is not considered for a run). The size of the row is given by the range given by the difference between the minimum and maximum (missing) packet sequences across all clients.

| Algorithm table 2 - Multicast NC matrix builder's function. |
| --- |
| var: prediction // −1 disable, >0 otherwise |

```
1     procedure createMulticastRow (pendingArray)
2       columns ← pendingArray.columns ( )
3       array ← int [columns]
4       for y = 0; y < columns; y++ do
5         packet ← pendingArray [y]
6         if packet.isAcked ( ) then
7           array[y] ← PACKET.AVAILABLE
8         else
9           if packet.isTimeout ( ) then
10            if packet.isMissing ( ) then
11              if packet.isMulticastable ( ) then
12                if prediction == −1 then
13                  array [y] ← PACKETMISSING
14                else
15                  if predictMulticast (packet, prediction then
16                    array [y] ← PACKETMISSING
17                  else
18                    array [y] ← PACKETNOTAVAILABLE
19                  end if
20                end if
21              else/*not multicastable*/
22                array [y] ← PACKETNOTAVAILABLE
23              end if
24            else/*not missing*/
25              array [y] ← PACKETAVAILABLE
26            end if
27          else/*not timeout*/
28            array [y] ← PACKETAVAILABLE
29          end if
30        end if
31      end for
32      return (array)
33    end procedure
```

The construction of the NC matrix is accomplished through the use of the auxiliary function createMulticastRow( ), as shown in Algorithm 2. This function is called for every client that has timed out packets requiring retransmission, and where the pendingArray argument variable has the meta and state information about all the packets in pre-determined range.

For each packet in that range, the present solution checks if it was already acknowledged (lines 6-8), and if so it fills that particular column with PACKET AVAILABLE. Otherwise, the present solution needs to check if the packet is suitable for multicast retransmission. To focus on newer packets, we have a predefined threshold (default 2) that limits the number of times a packet can be retransmitted using multicast (line 11). If the packet is below this threshold, then we check if a prediction is available. If no prediction is available, then the described solution always considers the packet for multicast retransmission. Otherwise, the described solution uses the prediction (by the solution prediction service) to decide if the packet should be considered by the source coding algorithm (lines 15-20). Either if the packet is not timeout, or if is not missing, then it is considered speculatively available.

Algorithm table 3 - Greedy source coding algorithm.

| | |
|---|---|
| | var:mat // NC matrix with missing packets |
| | var: bandwidth // total available bandwidth |
| | var: deadline // for algorithm execution |
| | var: linearComb // best linear combination of packets |
| 1 | procedure SourceCoding (mat, linearComb, currentScore) |
| 2 | if deadline > now ( ) then |
| 3 | return (linearComb) |
| 4 | end if |
| 5 | if UsedBandwidth (linearComb) > bandwidth then |
| 6 | return (linearComb) |
| 7 | end if |
| 8 | bestOrderedCols ← mat.getBestOrderedColumn( ) |
| 9 | foreach col ∈ bestOrderedCols do |
| 10 | newScore ← score (linearComb ⊕ col) |
| 11 | if newScore > currentScore then |
| 12 | newMat ← mat.clone ( ) |
| 13 | newMat.fillColumn (col, index ( ) ) |
| 14 | linearComb ← linearComb ⊕ col |
| 15 | return(newMat, SourceCoding (newMat, linearComb, newScore) ) |
| 16 | else |
| 17 | return (mat, linearComb) |
| 18 | end if |
| 19 | end foreach |
| 20 | end procedure |

The described solution actual source coding algorithm is shown in Algorithm 3. It tries to find the best linear combination among the missing packets in order to reduce bandwidth usage. It uses the NC matrix constructed by calling createMulticastRow( ) (Algorithm 2) for all the clients requiring packet retransmissions.

Given the potential large search space, a deadline on the maximum time for this computation (lines 2-4) is imposed. The bandwidth usage is also estimated and finishes the computation earlier if the multicast bandwidth quota has been depleted (lines 5-7). For the sake of clarity, the implementation optimizations is omitted such as pre-calculation of data on the matrices (line 8).

The present solution designed a greedy strategy which recursively tries to linearly combine packets from the columns exhibiting more packet loss. At each step, the new linear combination is evaluated (line 10), with the score being the total of missing packets (while taking FEC into account). When additional packets are recovered from FEC, then they are assigned as PACKET AVAILABLE (for the current instance).

If the new combination improves the current score, then it gets applied to a copy of the NC matrix and the algorithm is called recursively (lines 11-15). On the other hand (line 17), if the new column did not improve the current linear combination, it gets discarded and the previous combination is returned.

The multicast sub-scheduler, shown in Algorithm 4, calls the source coding algorithm while enough bandwidth is available and the deadline has not elapsed (lines 7-9). In this process, it adds each new packet (linear combination of source packets, line 10) to the retransmission list, returning it at the end (line 12).

Algorithm table 4 - Multicast sub-scheduler retransmission algorithm.

| | |
|---|---|
| | var: mat // NC matrix with missing packets |
| 1 | procedure MulticastGreedyScheduler (mat) |
| 2 | packetList ← null |
| 3 | while mat.getRowsWithMissingPackets ( ) > 1 do |
| 4 | linearComb ← null |
| 5 | score ← 0 |
| 6 | (mat, linearComb) ← SourceCoding (mat, linearComb, score) |
| 7 | if linearComb = null then |
| 8 | break |
| 9 | end if |
| 10 | packetList ← packetList + linearComb |
| 11 | end while |
| 12 | return (packetList) |
| 13 | end procedure |

Figure 22:
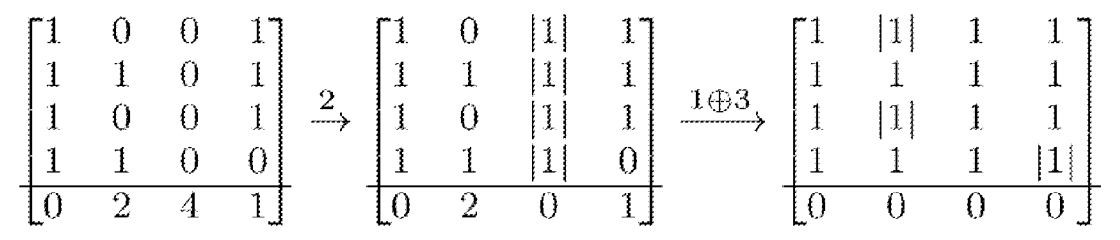

An example of the execution of the source coding algorithm is shown in FIG. 22. There are considered 4 clients. The last line, indicates the total number of missing packets per column. For the first step (leftmost), packet 2 is applied. In the second step, 1⊕3 (linear combination of packet 1 and 3) is applied. At this point there are not any other missing packets. Both packet(2) and packet(1⊕3) will be multicasted to all clients.

In an embodiment, the WiFi and 4G unicast network sub-schedulers can be considered in the present disclosure. The same algorithm for supporting both WiFi and 4G unicast retransmissions is preferably used as they share the same underlying constraints, i.e., lossy wireless unicast channels.

The unicast sub-scheduler handles each client separately, contrary to the approach used in the multicast sub scheduler. Here, all the packets requiring retransmission in a per-client fashion are determined, for each pending transmission matrix, i.e., that contains packets requiring retransmissions.

Prior to calling our unicast retransmission algorithm, Algorithm 6, an intermediary matrix representation that uses prediction, if available, was constructed as shown in Algorithm 5. As with the NC matrix for the greedy multicast retransmission algorithm, this intermediary matrix serves as the temporary placeholder.

Our unicast algorithms follows an optimistic approach regarding the reception of retransmitted packets. As shown in the helper function, shown in Algorithm 5, the present solution only disables this optimistic behavior when running the algorithm for 4G, in order to force retransmissions if needed (as the 4G sub-scheduler is the tail of the pipeline), or if the matrix has past half of its timeout in an attempt to avoid missing deadlines, for both WiFi and 4G unicast sub-schedulers (lines 7-12).

Each pending retransmission matrix was scanned for timed out packets that were not considered by previous subschedulers of the pipeline, i.e., packets still requiring retransmission (lines 16-17). For these, if there is not a prediction available, then the packet is considered for retransmission (line 19). However, if a prediction is available, then we first check if the packet is parity (line 21). Since we do not retransmit parity packets, we assign a PACKET MISSING status just to denote that it was not acknowledged, but it will not be considered for retransmission (necessary for proper FEC recovery checks). For source packets, a trial to determine if the packet will be received by the client (lines 24-28) is performed.

If the packet is predicted to be received, then it is considered for retransmission (line 30), otherwise, it is assigned, for the current running algorithm instance, as PACKET AVAILABLE (it will be accounted as available by the FEC decoding algorithm) and it is postponed for retransmission in later stages of the pipeline (line 32). To be noted, that this state change is only applied to the intermediary representation, not to the actual state of the pending packet.

For all packets that are not timed out (line 16) and not missing (line 17), we have two possible outcomes. If the optimistic behavior (lines 37 and 44) is active, then it is assumed that the packet is available (lines 38 and 45), otherwise it is use flag the packet accordingly to its acknowledgment status (lines 40 and 47, using function is Acked( )).

After constructing the intermediary representation of a pending retransmission matrix, unicast retransmission algorithm can proceed to call, shown in Algorithm 6. It is also a greedy algorithm that makes use of the FEC encoding to minimize the number of packets needed to be retransmitted, so that the client can successfully recover the missing data. It returns the complete list of original packets necessary to recover the entire pending retransmission matrix, unless the deadline has elapsed, or the unicast bandwidth quota has been depleted (lines 4-9).

TABLE 5

Algorithmtable 5 - Unicast retransmission matric builder's function

|   | var: isWiFi // true if WiFi, false for 4G |
|---|---|
|   | var: has4GLink // device has 4G? |
| 1 | procedure filterMatrix (pendingMat, prediction) |
| 2 | optimistic ← true |
| 3 | packetList ← [ ] |
| 4 | 4 rows ← pendingMat.rows ( ) |
| 5 | columns ← pendingMat.columns ( ) |
| 6 | mat ← int [rows] [columns] |
| 7 | if !isWiFi & has4GLink then |
| 8 | optimistic ← false |
| 9 | end if |
| 10 | if pendingMat.isPastHalfTimeout ( ) then |
| 11 | optimistic ← false |
| 12 | end if |
| 13 | for x = 0; x < rows; x++ do |
| 14 | for y = 0; y < columns; y++ do |
| 15 | packet ← pendingMat [x] [y] |
| 16 | if packet.isTimeout ( ) then |
| 17 | if packet.isMissing ( ) then |
| 18 | if prediction == −1 then |
| 19 | mat [x] [y] ← PACKETMISSING |
| 20 | else/*with prediction*/ |
| 21 | if packet.isParity ( ) then |
| 22 | mat [x] [y] ← PACKETMISSING |
| 23 | else/*not parity*/ |
| 24 | isPacketReceived ← true |
| 25 | trial ← RMG.get ( ) % 100 |
| 26 | if trial <= prediction then |
| 27 | isPacketReceived ← false |
| 28 | end if |
| 29 | if isPacketReceived == true then |
| 30 | mat [x] [y] ← PACKETMISSING |
| 31 | else |
| 32 | mat [x] [y] ← PACKETAVAILABLE |
| 33 | end if |
| 34 | end if |
| 35 | end if |
| 36 | else* not missing*/ |
| 37 | if optimistic == true then |
| 38 | mat [x] [y] ← PACKETAVAILABLE |
| 39 | else |
| 40 | mat [x] [y] ← packetPtr.isAcked ( ) |
| 41 | end if |
| 42 | end if |
| 43 | else/*not timeout*/ |
| 44 | if optimistic == true then |
| 45 | mat [x] [y] ← PACKETAVAILABLE |
| 46 | else |
| 47 | mat [x] [y] ← packetPtr.isAcked ( ) |
| 48 | end if |

TABLE 5-continued

Algorithmtable 5 - Unicast retransmission matric builder's function

| 49 | end if |
|---|---|
| 50 | end for |
| 51 | end for |
| 52 | return (mat) |
| 53 | end procedure |

Algorithm table 6 - Greedy unicast retransmission algorithm.

|   | var: fec // FEC algorithm to be used |
|---|---|
|   | var: bandwidth // client's available bandwidth |
|   | var: deadline // for algorithm execution |
|   | var: isWiFi // true if WiFi, false for 4G |
|   | var: has4GLink // device has 4G? |
| 1 | procedure UnicastGreedyScheduler (pendingMat, prediction) |
| 2 | mat ← fillMatrix (pendingMat) |
| 3 | while !fec.isDataComplete (mat) do |
| 4 | if deadline > now ( ) then |
| 5 | return (linearComb) |
| 6 | end if |
| 7 | if UsedBandwidth (pktList.size ( ) + 1) > bandwidth then |
| 8 | return (pktList) |
| 9 | end if |
| 10 | row ← mat.getRowWithLesserPkts ( ) |
| 11 | col ← mat.getColWithLesserPkts ( ) |
| 12 | if row.getMissingPkts ( ) < col.getMissingPkts ( ) then |
| 13 | mat.fillOnePktInRow (row) |
| 14 | else |
| 15 | mat.fillOnePktInCol (col) |
| 16 | end if |
| 17 | end while |
| 18 | foreach (w ,y) in mat do |
| 19 | if mat.isPktMissing (x, y) and !mat.isPktFECRecovered (x, y) then |
| 20 | pktList ← pktList + mat.getPacket(x,y) |
| 21 | end if |
| 22 | end foreach |
| 23 | return (pktList) |
| 24 | end procedure |

For each iteration, it compares which row (line 10) or column (line 11) has the lesser packets missing, using the functions getRowWithLesserPkts( ) and getColWithLesserPkts( ), respectively. Then it tries to fill one packet, either in a row (line 13), or in a column (line 15). In both cases, it only considers packets that are not recoverable using FEC, i.e., when searching for a packet in a row, it only considers the ones that are not recoverable using column parity, and vice-versa.

The procedure ends with the return of all the packets that were selected in the multiple iterations, excluding the ones that are recoverable using FEC (function isPktFECRecovered( )) (lines 18-23).

In an embodiment, the Complexity Analysis can be considered in order to provide a more detailed analysis of the present disclosure, a complexity analysis for the various mechanisms is presented in Table 3 in FIG. 23.

It is assumed that the stream is composed of a discrete set of matrices. Since a matrix acts as an epoch, all its packets share that same common epoch. The (absolute) deadline D associated with an epoch is calculated by adding a relative offset, e.g. 2 s, to the wall clock (at the time of matrix creation). All pending packets are considered lost after the deadline. In turn, retransmissions take place periodically at Rint intervals, e.g., 200 ms, up to D, allowing for up to R=D/Rint retransmissions rounds.

The matrix is initially transmitted via multicast, from the server to all the all clients, offering a one-to-all communication pattern on top of the network multicast primitive, and thus giving us O(1) bit complexity.

If the parity present in the matrix is enough to overcome the packet loss at the time of transmission, then no more rounds of communication are required. Otherwise, not enough parity was present to meet network conditions, and additional retransmission(s) round(s) are required, potentially up to R rounds, to ensure delivery of missing packets.

As previously shown, the server uses a scheduling framework to optimize retransmissions. For each round, missing packets can be retransmitted using either (WiFi) multicast or (WiFi, 4G) unicast. Multicast retransmission uses a linear combination of packets to overcome multiple missing packets across a set of clients. In the best case, a single packet is recovered at each client giving it a O(1) bit complexity, while in the worst case, only a single packet is recovered across the entire set giving it a O(n) bit complexity.

When using unicast for retransmission, for both WiFi and 4G, the server replicates each single packet across the n authenticated clients, thus giving O(n) bit complexity that exhibits a one-to-all communication pattern.

The present disclosure has a built-in key continuity mechanism where each matrix has the next symmetric key for the streaming session, with key rotation happening periodically at predefined intervals. If a severe network condition prevents a client of receiving a packet for more than this interval, then the client will miss a key rotation. To overcome this issue, an SSL based renegotiation takes place, where the client receives the necessary missing keys from the server. If the network outage is global, then all the clients will require key renegotiation, leading to O(n) bit complexity.

The membership services are based on a SSL based handshake, where each client authenticates with the server, thus exhibiting a O(n) bit complexity.

For last, our current D2D offloading implementation forces every node to periodically request missing packets from all its neighbors, leading to O(n2) bit complexity, in an all-to-all communication pattern.

In an embodiment, the Security can be considered by the introduction of untrusted nodes, via edge clouds, required the design of secure protocols from the ground up. Furthermore, it is assumed the presence of curated streams from institutional feeds, e.g., sports teams, museums, and thus requiring stream integrity. At the same time, it is required to have a strong authentication and authorization mechanisms.

In an embodiment, the Threat Model can be considered by the threat model considers two types of adversaries. The first type will try to inject unwanted streams in the system, while the second type tries to abuse the P2P networking provided by the edge cloud.

In an embodiment, the Authentication, Authorization and Trust Model Public key certificates are used as the basis for the identity model. If the client does not have a certificate, it starts by generating a new certificate signing request (CSR) and sends it to the certificate authority (CA) so it can be signed. External secure token to sign this certificate request are not used, but it can be easily integrated in our infrastructure, or alternatively, using a secure side channel to perform the validation of the CSR.

This piece is considered dependent of the target institution hosting the system. Of course, not implementing an effective way to validate CSRs would leave the system open to Sybil attacks. While creating multiple identities would be useful for performance attacks it would not impact stream integrity.

The described authorization schema relies on strong authentication, with the client only being able to stream or participate in the edge cloud if they have a signed certificated by our CA. Since users bring their own devices, and can deviate from the original protocol, we impose this strict trust model. However, edge clouds require that some trust has to be given to mesh neighboring nodes, in particular to nodes hosting WiFi-Direct legacy groups, i.e., hotspots. By design, the presence of malicious nodes will only impact performance and not integrity, since only video chunks that are digitally signed by our trusted server are considered for playback. If a node maliciously withholds retransmissions packets or rejects P2P connections, then we will have to fallback to the wireless infrastructure (WiFi AP or 4G) or other mesh nodes.

In an embodiment, the Forward Secrecy and Stream Integrity is assured by enforcing key rotation over the stream lifetime. The key rotation is governed by epochs, with epoch being a definable amount of streaming matrices, e.g., a new epoch every 20 matrices. Each streaming packet includes the key for the next epoch, encrypted with the current epoch's key. This avoids the need, on the fault free path, of permanently using a secure channel to retrieve these keys. The fault free path is considered when matrices are sequentially retrieved without gaps. For these gaps to happen, a matrix has to timeout without holding any data packet, e.g., prolonged loss of WiFi association with the AP.

The presence of gaps in the transport matrices requires the design of fallback mechanism. For that purpose, a secure TLS infrastructure is used to retrieve the missing keys from our server.

In an embodiment, the Double Signature Schema can be considered in order to insure stream integrity, authentication and non-repudiation, all packets are digitally signed. It would be too costly to fit RSA signatures, that should be at least 2048b-256B long, into our UDP headers. An alternative would be to group packets and perform a signature on the set but a missing packet would prevent verifying the signature. Instead in an embodiment for better results, an elliptic curve cryptography was used, namely 256-bit ECDSA prime256v1 [24], which only imposes a ~72B overhead per packet.

A double signature schema was used, as depicted in FIG. 6. The packet signature allows the verification of the identity of the sender, which is either the trusted server or a node in the edge cloud, whereas the video data signature allows the verification of the creator of the chunk, that always originates from the trusted server.

The reconstruction of a missing packet by a node, as shown in FIG. 7, uses the recovered video chunk to create a brand new packet which is then signed using the node's private key. When this packet is shared with other nodes, these use the packet signature to verify that the sender is actually authorized to do so. This followed by a second verification on the video chunk signature, that is matched against the trusted server certificate (and dropped if it fails). To be noted, that if a packet signature belongs to the trusted entity, then the verification of the video chunk is no longer required, allowing for a reduction of the computational load. Even if a malicious node tries to introduce a corrupted video chunk, it will be unable, as it does not have the private key of the trusted server. Only the trusted server is able to create new video chunks, thus stream integrity is guaranteed at all times.

In an embodiment, the Security-as-a-Service for Mobile Edge Clouds can be considered by the Secure tokens are used to authorize the connections between nodes in the edge cloud. These tokens are generated solely in the server and sent to edge nodes to provide authorization for local P$_2$P links for both Bluetooth and WiFi Direct (P2P and hotspot). In the case of Bluetooth and WiFi Direct P2P, the secure token also serves as an alternative authentication method. This allows us to setup connections without requiring user interaction, such as inserting a PIN, that would hamper usability.

For WiFi Direct in hotspot mode, the secure token supersedes the password based authentication. After associating with a hotspot, a client has to send its secure token to prove that it is allowed to join, otherwise it gets disassociated. This was done to ensure that if the Android generated password is leaked, only authorized clients are allowed to join he mesh.

In an embodiment, the Mobile Edge Cloud Offloading can be impose several restrictions on the construction of edge clouds. Opposing the normal ad-hoc approach to mesh construction that uses low-level mechanisms such as Multicast Network Service Discovery (DNS), this management and discovery is centralized in our backend. This is essential mandate by the design requirements to adjust to different deployment scenarios. Furthermore, we ensure that local connections are authorized, thus no $P_2P$ link is established without having proper credentials or secure tokens.

Adhoc WiFi connections are not used as it would require the devices to be rooted.

In an embodiment, the Bluetooth can be considered in the present disclosure.

Bluetooth Low Energy (BLE) was not considered, and only used version Bluetooth (BT) 4.0 for its added bandwidth capacity. Theoretically, BT is capable of reaching 2 Mbit/s for short ranges. To be noted that this bandwidth is shared between all the active connections, so increasing the number of neighbours will result in lesser bandwidth per connection/peer.

In an embodiment, the WiFi-Direct can be considered in the present disclosure.

Currently, only Android supports the WiFi Direct specification. Apple provides an alternative approach on top of their multipeer and bonjour frameworks, which are considered out-of-scope.

The support in Android for WiFi Direct comes in two flavors, one is a true $P_2P$ link that allows the device to maintain access to an access point, and the other is a legacy mode that provides a hotspot that allows other devices to connect to it.

For the first method to work, it had to resort to reflection to avoid manual confirmation by the user for each link established with his device (by means of a popup window). Android does not provide a permission towards avoiding this behavior (despite being actively requested by developers). The upcoming support for WiFi-Aware specification in Android devices hardware will provide a clean support for using WiFi P2P connections. Currently, despite being supported by Android Oreo, only recently devices started to provide support for it, such as the Samsung S9 (European's exynos version).

For the second, the node hosting the hotspot, called Group Owner (GO), can still maintain a connection to the access point, while the "clients" associating with the hotspot cannot maintain a link to the access point. Google offers a somewhat limited implementation for WiFi direct, as it does not allow any networking configuration to be performed (the subnet is fixed as 192.168.49.0).

An additional limitation is the lack of Internet connectivity by the clients, as the hotspot does not provide NAT out-of-the-box. A workaround for this issue can be achieved by deploying a HTTP proxy built into the app. These do not require root access as it can be fully implemented in the application level. the present solution implementation contains a HTTP(s) proxy that enables client devices to maintain Internet connectivity.

In an embodiment, the Edge-Cloud Offloading can be considered in the present disclosure.

The present disclosure's offloading approach is actively pursued by the mobile devices. The backend only provides security and discovery services to support the mesh construction. Each individual device has to periodically request its neighboring nodes for any missing packets. As of now, requests asking for the missing packets are spread uniformly across all available mesh topologies, i.e. BT and WiFi Direct.

In an embodiment, the Frontend Implementation can be considered in the present disclosure.

The present disclosure implementation intended to provide a portable approach so future ports could be easily accomplished. Here it is illustrated the Android implementation, with the specific bindings to the Android operating system.

While mobile OSes normally provide a media framework, e.g., MediaCodec for Android and VideoToolBox for iOS, the goal was to achieve a media player that would handle hardware acceleration for video decoding.

In an embodiment, the Portable Media Player can be considered in the present disclosure: The present disclosure relies on VLC, a well-known open-source project that supports hardware acceleration in both Android and iOS, while providing a software decoding infrastructure, using ffmpeg, as a fallback. The present disclosure seamlessly integrates within in media player by adding a new transport protocol for ffmpeg, dubbed iris. The present disclosure seamlessly integrates within in media player by adding a new transport protocol for ffmpeg, dubbed iris. This was achieved by implementing a new transport module that consists in four primitives, namely, a) open, b) read, c) seek and d) close.

In an embodiment, the Secure and Portable Reliable Multicast Library can be considered in the present disclosure: For convenience, it was implemented a single library that holds both frontend and backend code, since a significant amount of code is shared between the two. However, for better organization we make extensive use of namespaces and follow a Java like project layout for files, i.e., each sub-namespace in a separate directory, following a tree hierarchy. The code is implemented using C/C++ in an effort to make it portable and efficient. It currently has 31k lines of C/C++ code and 1k of Java code. It is leveraged existing open-source libraries for networking (poco), erasure coding (openfec), marshalling (protobuffers) and cryptography (openssl). Additionally, it was used RPC (grpc) to bridge the present solution's backend C++ code base with WEKA [31], for the prediction service.

In an embodiment, the Android's Specific Frontend can be considered in the present disclosure: In order to reduce latency, it was designed an Android service that runs on the background and performs all the necessary management to support the present solution's secure streaming system, more specifically, certificate validation, sign in and edge cloud setup. Using this approach, it can immediate start streaming will edge cloud support from the onset.

Figure 8:
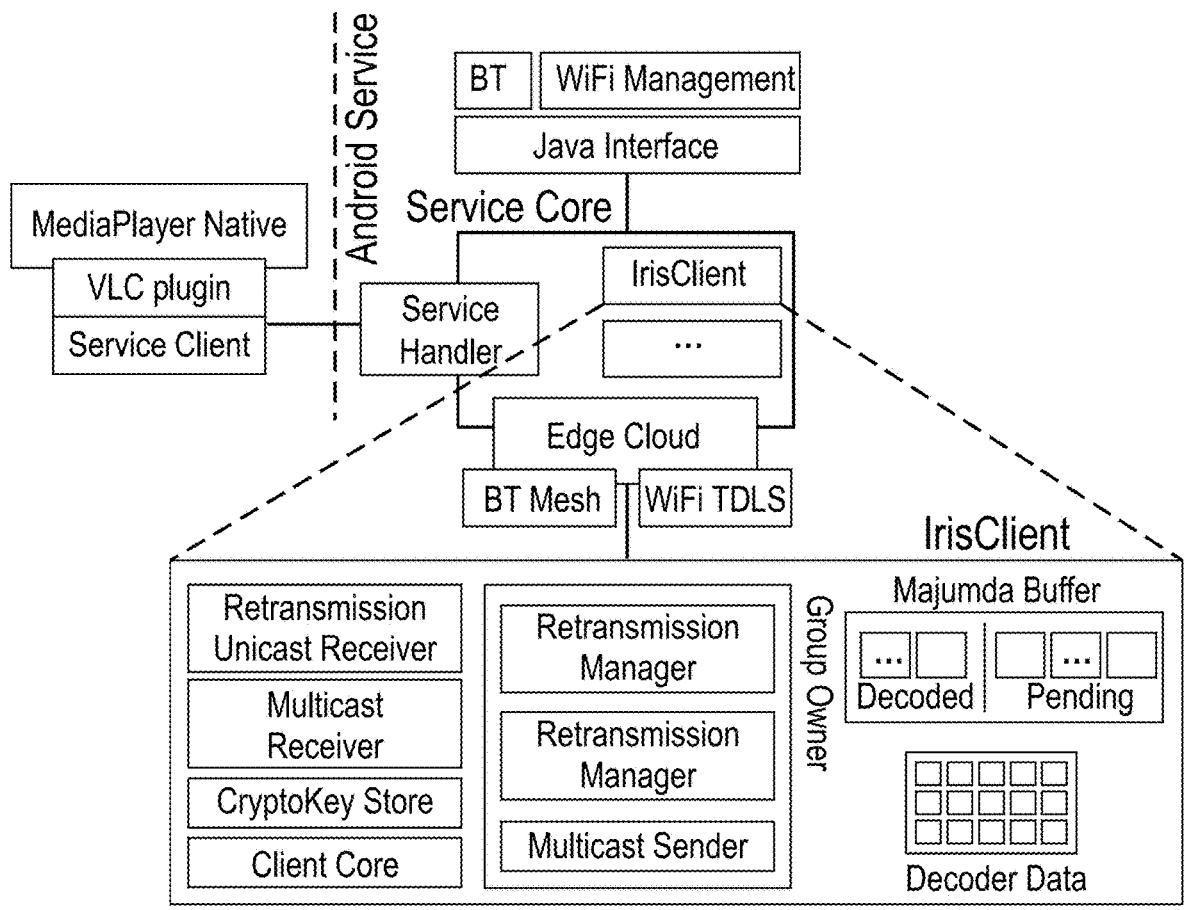
FIG. 8: Schematic representation of an embodiment of the frontend Implementation.

This Android service, depicted in FIG. 8, provides a server handle that allows stream management from client applications. The client side is implemented as a VLC plugin. We provide a new transport layer that sole purpose is to interact with you service (leftmost portion of the picture).

The present disclosure's Android service provides support for edge clouds and streaming. Each stream is handled by a separate IrisClient, corresponding to an independent multicast stream. It should be noted that the support for edge clouds is modular, and is shared across all the streams present in the system. By disabling this module, we are only removing the offloading capability, but the system continues to work as expected, i.e., solely relies on the infrastructure to obtain the stream(s) using WiFi and possibly 4G.

Within each IrisClient the described solution has network handlers to receive both multicast (Multicast Receiver) and unicast (Retransmission Unicast Receiver) UDP packets. The Key Store provides all the necessary key management, namely symmetric keys used in the multicast stream, secure tokens used for edge clouds, and certificates for PKI.

The Group Owner module offers WiFi Group (Hotspot) functionality which includes retransmissions, membership manager and a multicast sender. The first, serves the same purpose as the one found in the backend, minus the capability of performing source coding. This design solution was meant to minimize computational overhead on the device.

In an embodiment, the Android's Adaption Layer can be considered: The frontend interacts with the Dalvik VM through standard Java Native Interface (JNI). This is required to access portions of the Android's API that does not have native bindings, or at least, public ones. It is avoided using private API libraries to increase compatibility, as their modifications could potentially break our approach. Furthermore, certain subsystems, such as Bluetooth, are only available through the regular permission schema, that in turn are only available within Java APIs.

To avoid the problem of having to expose a large API through JNI and to make it easier to adjust to new system calls, a generic RPC mechanism based on protobuffers was implemented to abstract the calls between our C/C++ code and Java. The described solution adaption has two major components, a Bluetooth manager and a WiFi manager. The first supports all the necessary plumbing to offer a socket oriented interface, including low level socket system calls, namely read( ), write( ), close( ), listen( ) and connect( ). All the WiFi related operations are handled by our WiFi manager, that supports both WiFi-Direct and infrastructure WiFi management, including the creation and destruction of WiFi groups and association and disassociation to and from WiFi SSIDs.

The evaluation of results is discussed below in the present disclosure.

The evaluation is centered on three main concerns, namely, initial video latency, bandwidth used at the access point, and lastly, energy used by the mobile devices. Given the combinatorial space for all parameters present in the described solution system, it would intractable to perform a full analysis on all possible combinations.

This evaluation is to practically demonstrate the feasibility of your approach. First is provided a comparison with current state-of-the-art without using edge-cloud offloading, since those approaches lack support for it. This will serve as a baseline performance measurement regarding bandwidth savings by the infrastructure and latency experienced by the users, while experiencing varying levels of network conditions.

In the second part of the evaluation, edge-clouds offloading are included in an effort to assess the impact it has in the base solution, and empirically verify its merits towards answering the questions posed by the current problem statement.

In an embodiment, the Experimental Setup and Methodology can be considered in the present disclosure.

The experimental setup has composed of 28 mobile devices, including 8 Nexus 5X and 20 Samsung devices. All the devices used Android 7 (Nougat). Due to issues with Nexus 5X regarding D2D communications, they were excluded from the second part of the evaluation (with edgecloud offloading).

All the devices and a Cisco 3700 access point within a 2 $m^2$ area were disposed. The AP was configured to use a 40 Mhz channel over fixed channels, maintained the default 100 ms for the beacon interleave, changed the DTIM (Delivery Traffic Indication Message) from 2 to 1 and disabled all basic rates below 24 Mbps.

Each test was performed 5 times, with a 5 minute duration for each run. The video encoding was performed using NVIDIA's NVENC for HEVC hardware acceleration supported by an ASUS GTX 1060 GPU. Lastly, a six-core Intel Haswell server with 32 GB of RAM was used.

In an embodiment, the Comparative Evaluation Without Edge-Clouds can be considered in the present disclosure.

To evaluate the approach, without edge-cloud offloading, it was measured against HTTP Live Streaming (HLS) (which is the current standard for unicast live streaming, serves as a baseline), Cisco's StadiumVision and Streambolico (C4S). For the last two, and since they are closed source solutions, there were performed changes to the present solution's platform, including source code and configurations changes, to accommodate both Cisco and Streambolico's system descriptions.

For Streambolico, unicast support was removed and configured the system to not use FEC. For that end, the transport matrix was projected into a vector, of dimension 4 (i.e., a matrix with a single row and 4 columns). For Cisco, it was also disabled unicast and configured FEC to ~150% over the original source packets, featuring 4 rows, 4 data columns, 1 parity row and 1 parity column (representing 25 total packets over 16 source packets for an overhead of 156.25%).

The maximum advisable of multicast usage should be between 30% to 40% of the total available bandwidth as indicate by major network vendors. Assuming the worst-case scenario, with clients connecting with a 24 Mbit/s rate, and using a ratio of 30% then there will be 7.2 Mbit/s of multicast. Since the present solution still has to accommodate the original multicast stream that goes up to 1000 Kbit/s (not accounting for FEC), it was decided to set a hard limit of 6 Mbit/s of multicast bandwidth for retransmissions, in both C4S and Iris according to the present disclosure. Additionally for Iris, it was set 10 Mbit/s as the hard cap for WiFi unicast and 2 Mbit/s for 4G unicast within the bandwidth managers, per client.

Three bitrates were evaluated, including 250 Kbit/s (low quality), 500 Kbit/s (medium quality) and 1000 Kbit/s (high quality), across three distinct set of clients containing 7, 14 and 28. Additionally, packet loss to test robustness was artificially introduced. It was varied this loss between 0%, 20% and 40%, and since in stable conditions 802.11n already introduces up to 10% packet loss, the final packet loss introduced in the various experiments range from [0,10]%, [20,30]% and [40,50]%.

In all the legends, the last number reflects the bitrate used, e.g., iris 4G 1000 uses a 1000 Kbit/s bitrate. All results show average with corresponding confidence interval of 95%.

In an embodiment, the Live-Streaming Only Using WiFi can be considered in the present disclosure.

The performance of the present disclosure against HLS, StadiumVision and C4S, were primarily analyzed without 4G support. This was done to provide a baseline as only Iris is able to support 4G. Consequently, Iris' prediction service was disabled since it lacked multipath capabilities.

In an embodiment, the Bandwidth Usage-WiFi Only can be considered in the present disclosure.

Figure 9:
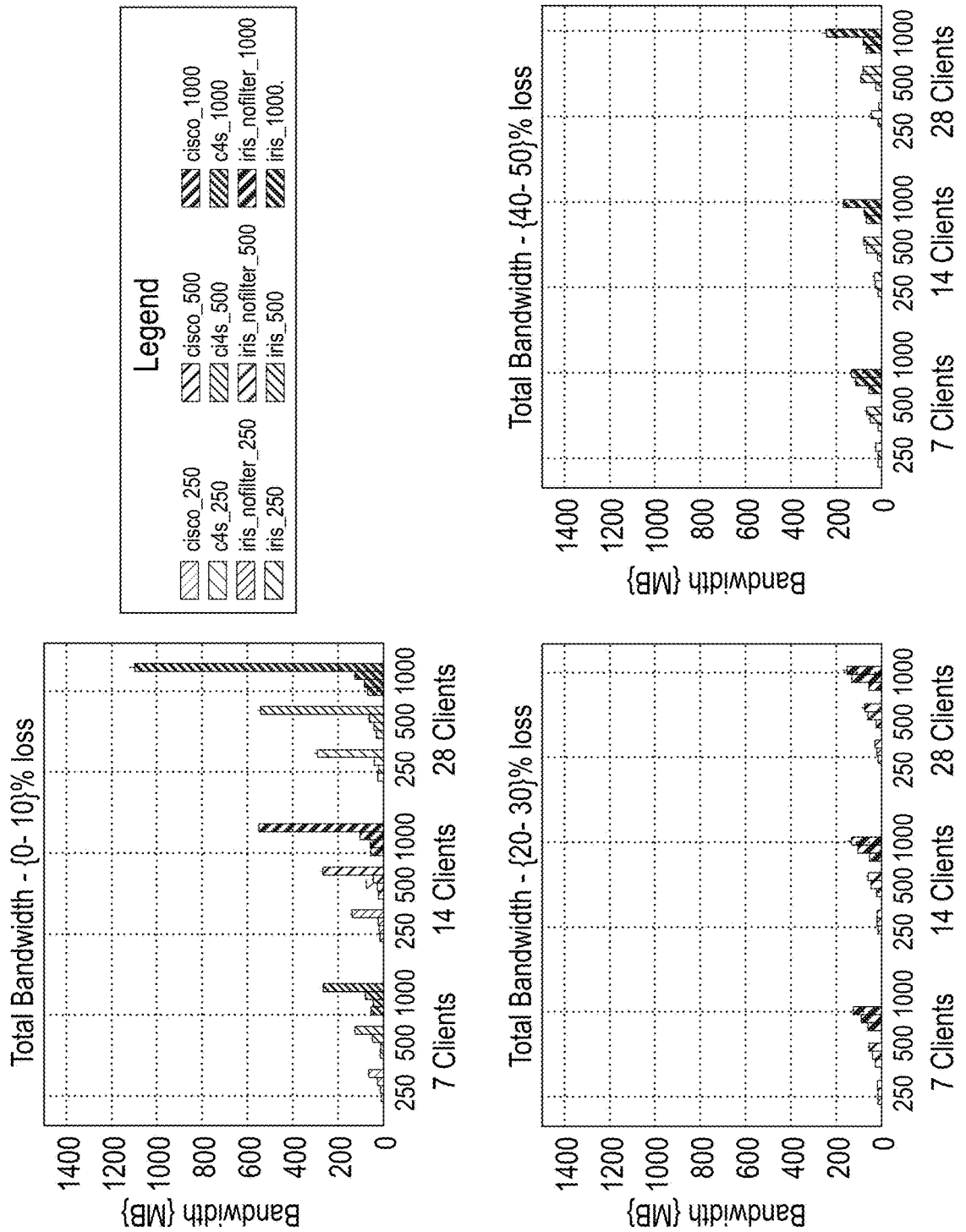
FIG. 9: Schematic representation of an embodiment of the total WiFi download bandwidth usage without 4G and edge offloading.

The bandwidth usage is shown in FIG. 9. To be noted that since HLS uses HTTP(S) that runs on top of TCP, it is exposed to its inherent limitations. The most problematic is the exponential back-off for each retransmission that is best suited for wired connections and not wireless links. Because of this, it was not consider HLS results for packet loss rates above 10% since the streaming would continuously stall.

Since StadiumVision uses a fixed multicast configuration, it requires fixed amount of bandwidth of ~22, ~40 and ~74 MB for 250, 500 and 1000 Kbit/s, across all packet loss rates and independently of the number of clients.

In an embodiment, for [0,10]% packet loss: HLS exhibit a maximum download bandwidth usage of ~1120 MB (and 34 MB for upload) with 28 clients. Generally speaking, HLS performs as expected, doubling the download bandwidth used as the bitrate or number of clients is doubled. Both C4S and the disclosure show a linear increase of download bandwidth with the linear scaling of both bitrate and clients. When compared to C4S, the present disclosure uses ~136 MB against ~80 MB from C4S, while using 1000 Kbit/s and 28 clients.

Figure 10:
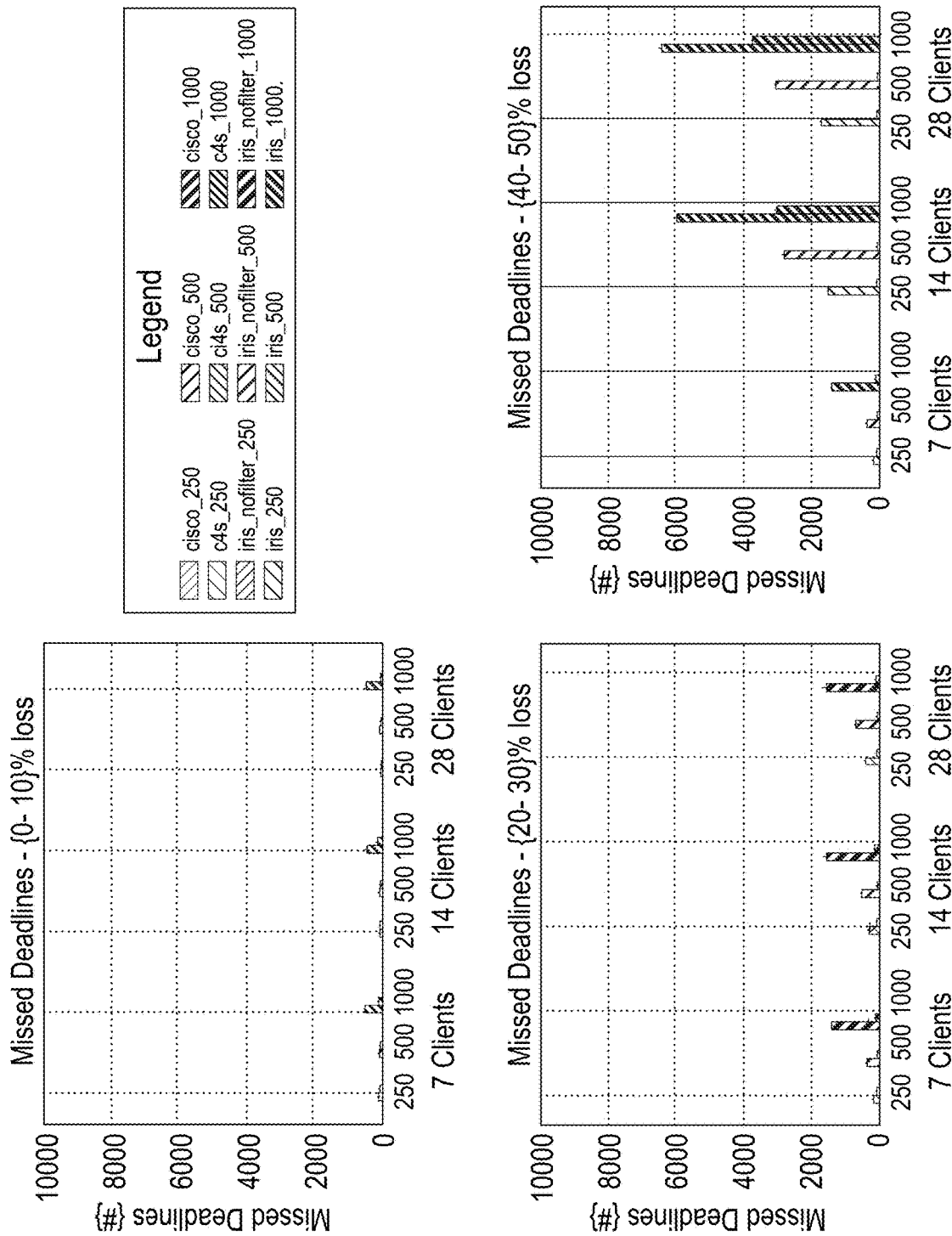
FIG. 10: Schematic representation of an embodiment of the missed deadlines without 4G and edge offloading.

In an embodiment, for [20,30]% packet loss: the gap between C4S and Iris closes. Just by looking at the download bandwidth used, it seems counter-intuitive for it to happen. However, these are explained with the introduction of the data regarding missed deadlines (FIG. 10).

In an embodiment, For [40,50]% packet loss: the present disclosure requires more than double the download bandwidth when compared to C4S. This is due the use of unicast bandwidth by Iris that only offers 1-to-1 retransmission capability, and not the 1-n of multicast. However, the QoE offer by C4S is greatly impacted by its design.

The present disclosure used ~251 MB of download bandwidth and ~15.5 MB of upload bandwidth, while C4S used ~90 MB and ~20 MB, on average, for download and upload, respectively. The increase of upload bandwidth usage by C4S is indicative that the reports sent by clients are larger than the ones sent by Iris's clients. This means that the number of matrices that have missing packets is higher in the C4S case, and thus exhibiting a less efficient transport mechanism.

In an embodiment, the Missed Deadlines-WiFi Only Schedulers can be considered in the present disclosure.

FIG. 10 shows in an embodiment of the number of missed deadlines with the increasing number of clients and bitrate and varying packet loss rates. StadiumVision reveals the worst behavior from the group, with missed deadlines doubling at each bitrate step increase for all packet loss scenarios. In the worst case, StadiumVision exhibits ~6460, on average, for 28 clients when using a 1000 Kbit/s bitrate when exposed to [40,50]% packet loss.

In an embodiment, For [0,10]% packet loss: the losses are residual for both C4S and the present disclosure. For StadiumVision, it exhibits ~497 missed deadlines that while it apparently seems low, it has a visible impact on the streaming quality. If a missing deadline affects a key-frame this means that the video will be stalled until the next key-frame is available, while in a less severe case, it will affect B or P-frames that will immediately introduce artifacts with varying level of impact, depending mainly on the dynamism of the scene, e.g., sports footage will be greater affected than a slow paced cartoon.

In an embodiment, For [20,30]% packet loss: C4S has ~117 missed deadlines that starts to severely impact stream quality, for 28 clients and 1000 Kbit/s bitrate. StadiumVision's missed deadlines reach ~1715 for the same configuration. Both approaches have linear increases in the scaling of both clients and bitrates.

In an embodiment, For [40,50]% packet loss: both StadiumVision and C4S are unable to provide a reliable stream, featuring a high level of video corruption and stalls across all configurations. For 28 clients and 1000 Kbit/s bitrate, StadiumVision has ~6460, while C4S has ~3772 missed deadlines, on average.

Iris is the only approach that has residual missed deadlines across all configurations and packet loss rates.

In an embodiment, the Latency-WiFi Only can be considered in the present disclosure.

Figure 11:
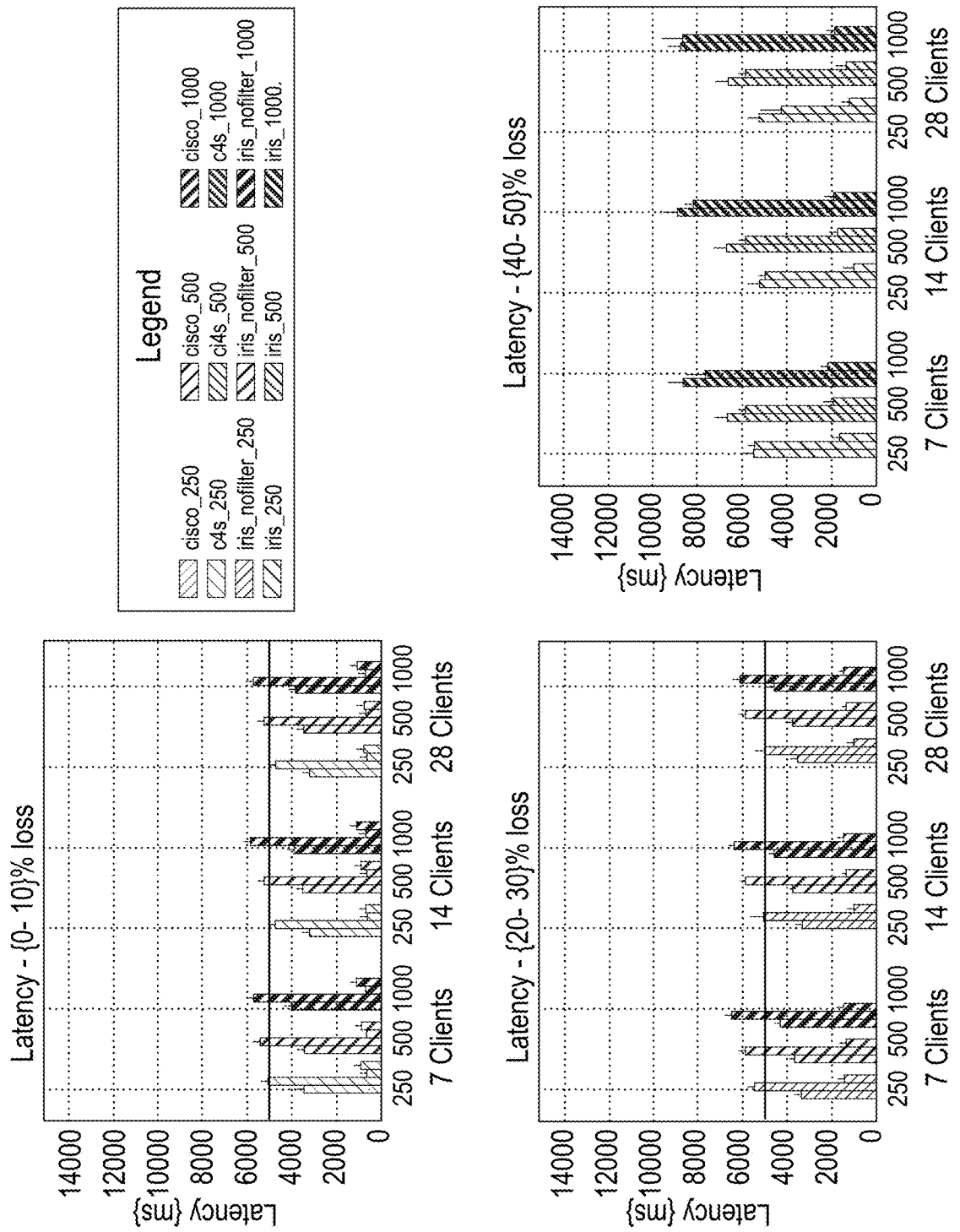
FIG. 11: Schematic representation of an embodiment of the streaming latency without 4G and edge offloading.

Latency is well-known metric for assessing QoE, and it has been shown that users will stop the video stream if the video does not start within e.g. 5 seconds. We show this hard limit with a horizontal line in FIG. 11. C4S is the only approach is unable to meet this requirement remaining steady above 5 s, and in the worst case, [40-50]% packet loss with 28 clients and a 1000 Kbit/s bitrate, its latency reaches roughly 9 s. StadiumVision is able to remain below this limit for packet loss under 30%; but for higher packet losses it is not able be below this threshold, reaching a maximum of 8716±3289 latency.

In an embodiment, Iris offers the best latency: that is able to beat HLS, with a minimum latency of 861±117 ms, and a maximum of 2014±642 ms for all configurations.

In an embodiment, the Live-Streaming Using Multipath (WiFi and 4G) can be considered in the present disclosure.

We now assess the impact of 4G and the prediction service. In order to facilitate interpretation C4S and Iris (with prediction service disabled), were also previously added. To be noted, that only Iris is able to support multipath and 4G.

In an embodiment, the Bandwidth Usage-WiFi and 4G also can be considered in the present disclosure.

In the previous results, the prediction service was disabled since there was only a single path (WiFi), i.e., WiFi multicast and unicast are different primitives that share the same physical medium, so the actual alternative is to use 4G as a complementary communication path.

Here, it started analyzing the impact of adding 4G to the disclosure. Due to the costs associated with mobile data, the tests to only 1000 Kbit/s bitrate was restricted, since it is the most demanding one. Even with this restriction in place, it surpassed 100 GB mobile data used throughout all the experiments. To be noted, that the prediction service for our 4G pipeline stage was disabled. This was done because the pending retransmissions were forced, that were not able to be sent by WiFi multicast and unicast, to be sent by 4G.

Figure 12:
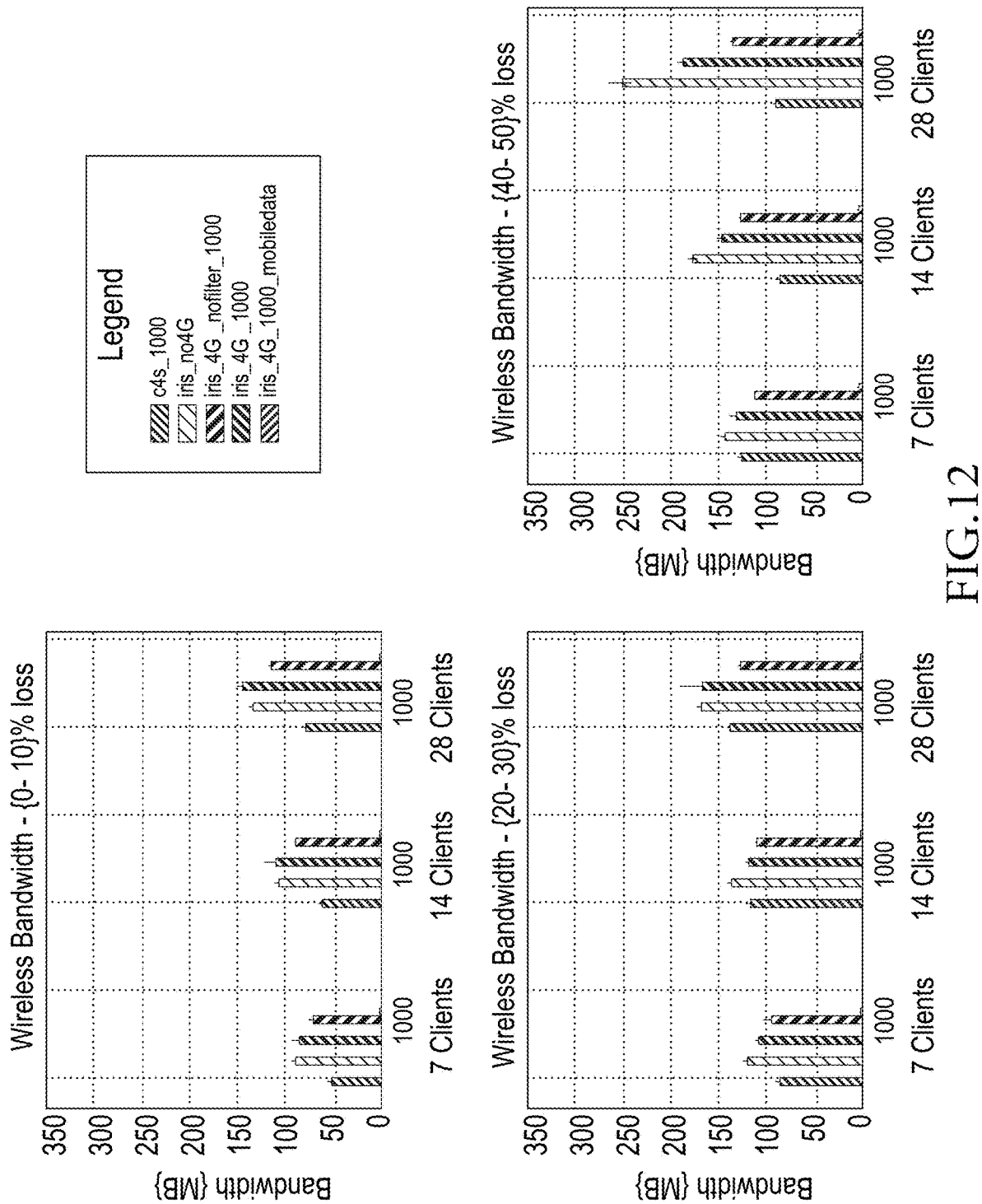
FIG. 12: Shows a schematic representation of an embodiment of the impact of 4G in total bandwidth usage without edge offloading.

FIG. 12 shows the impact of adding 4G with and without the described prediction model, dubbed "iris_4G_1000" and "iris_4G_nofilter_1000", respectively. The other bar shown are results from previous benchmarks that were put side-by-side to allow an easier comparison, namely, "iris no4G" features results with only WiFi communications and "c4s-1000" reflects the behavior of C4S for 1000 Kbit/s bitrate. The amount of mobile data used (in "iris_4G_1000" configuration) is shown as "iris_4G_1000_mobiledata".

As previously assessed, both C4S and Iris show a linear increase with the scaling of clients and bitrates. C4S requires less bandwidth at the expense of missed deadlines, as seen in FIG. 10.

For the present disclosure, it shows that the introduction of 4G without using our prediction model is only able to offer a minimal improvement, for packet loss under 30%, across all bitrates and number of clients. However, with the introduction of our predictive model we go from ~251 MB and ~~16 MB, for download and upload bandwidth, to ~136 MB and ~17 MB for download and upload bandwidth for our 4G with prediction, in the most demanding test case of [40,50]% packet loss, 28 clients and 1000 Kbit/s bitrate.

This represents a 45% savings with each client only using ~5.2 MB of mobile data, on average, for a 5 minute video stream, resulting in ~142 Kbit/s that represents 14.2% of the original 1000 Kbit/s.

The following pertains to the impact of the Prediction Service.

Figure 13:
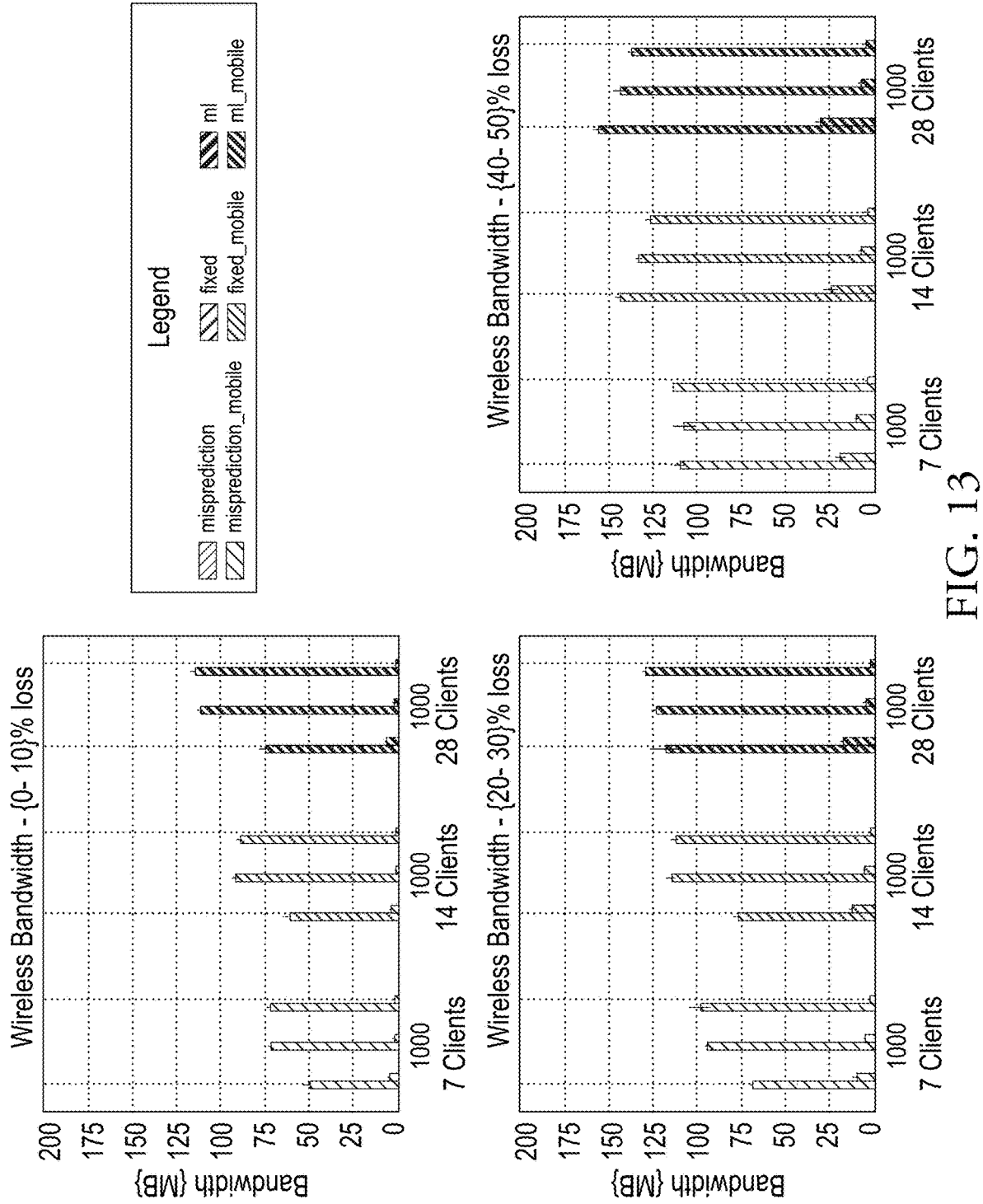
FIG. 13: Schematic representation of an embodiment of the prediction efficiency regarding bandwidth without edge offloading.

For better assessing the efficiency of the prediction model three distinct scenarios were compared, as shown in FIG. 13. The first called "misprediction" where the oracle always replied with a packet loss prediction, a "fixed" configuration where the outcome of the packet loss based on the actual preconfigured packet loss rate was predicted, i.e., for a setup of [40,50]% packet loss we used the upper limit, 50%, and performed a flip-coin trial based on that percentage to predict packet loss, and the last one ("ml"), the original that used the same strategy but used variable packet loss rate based on machine learning oracle.

The "misprediction" configuration basically forces all missing packets to be speculatively postponed to a later stage of the pipeline, starting with multicast, going through unicast and sinking on the 4G link. The missing packets are only reverted to the initial multicast stage if no more 4G bandwidth is available. Because of this, a significant increase of mobile data usage is observed when compared with the other two alternatives.

The differences between "fixed" and "ml" can be explained by the better prediction from the later. It should be noted that it was introduced a pre-defined amount of packet loss at the clients, i.e., 0%, 20% and 40%, but this amount is then increased with the actual packet loss of the medium, that in the described solutions conditions fluctuates around 10%. This 10% difference on the prediction is the factor that contributes for "ml" having a better performance, and thus indicating that the machine learning oracle is behaving as expected.

In an embodiment, the Missed Deadlines-WiFi and 4G can be considered in the present disclosure.

Figure 14:
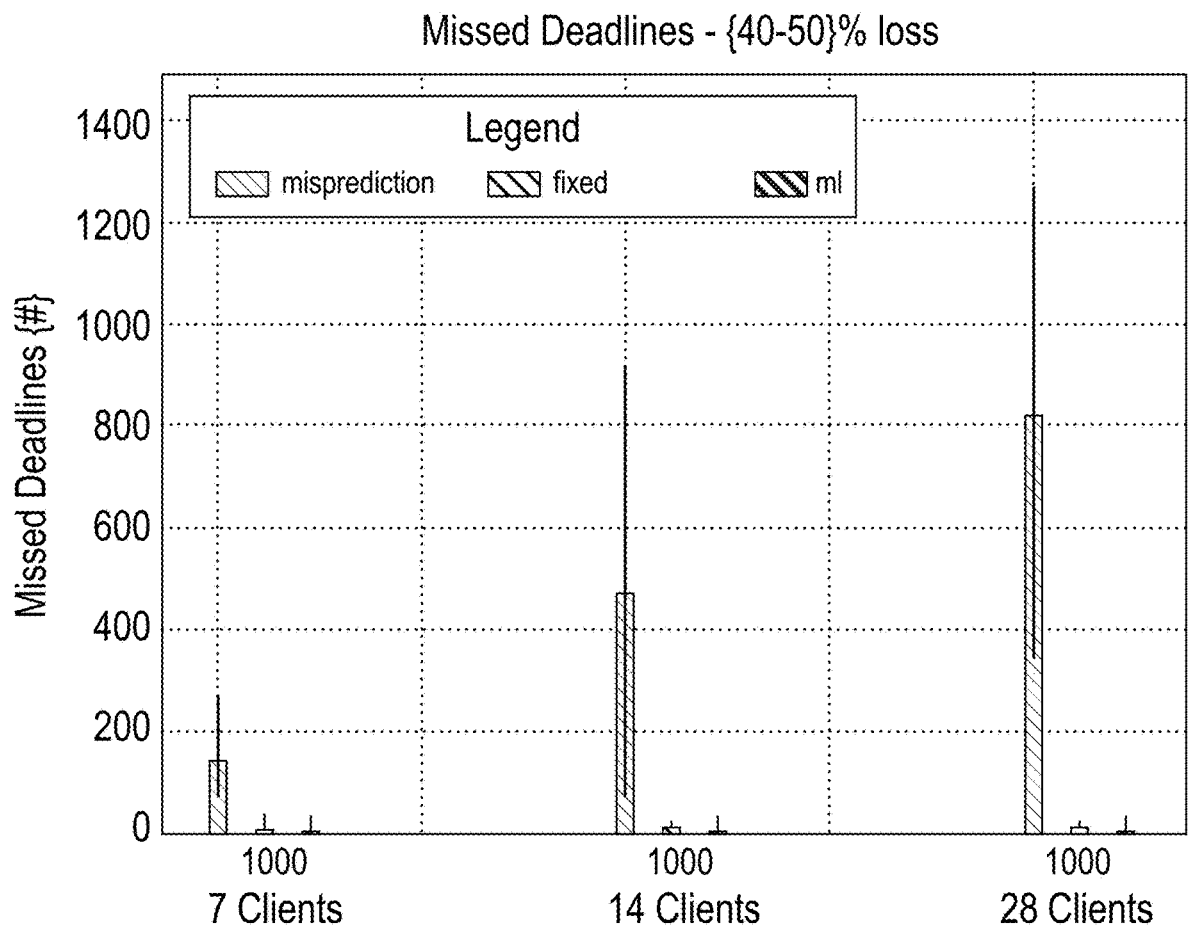
FIG. 14: Schematic representation of an embodiment of the prediction efficiency regarding missed deadlines without edge offloading.

FIG. 14 only shows the results for [40,50]% packet loss, since the for the other packet loss intervals the losses were residual for three prediction configurations. A substantial amount of missed deadlines is observed for the "misprediction" configuration. This is due to exhaustion of the 2 Mbit/s bandwidth available for 4G retranmmissions, as confirmed by the average ~1 Mbit/s mobile data consumption. When under heavy bursty packet losses, then the spare 1 Mbit/s is rapidly depleted (as we limit 4G to 2 Mbit/s).

In an embodiment, the Energy, CPU and Memory Usage can be considered in the present disclosure.

Energy usage evaluation using 4G was performed and machine learning based prediction model. Independently of the packet loss rate, the energy used was dominated by video decoding. As such, bitrate was the only true factor that changed significantly the energy used: for 1000 Kbit/s, 500 Kbit/s and 250 Kbit/s, it was measured around 3%, 2.25% and 1.15%, of average battery usage percentage (for a 5 minute run), respectively. This is in line with a normal video media player, allowing for 166 minutes (2.7 h) of continuous play, for a common 2700 mAh battery capacity.

Using the same setup, it was measured about 25% of CPU usage and 60±10 MB of memory usage, across all bitrates. To be noted that CPU usage remains fairly constant due to the fact the actual video decoding is offloaded to the GPU. While it wasn't measured GPU usage directly, it is trivial to infer this behavior directly from the energy usage pattern.

In an embodiment, the disclosure' Offloading Evaluation can be: since neither Streambolico or Cisco have support for edge-cloud offloading, this section focuses solely on Iris' performance. For evaluating the impact of introducing both edge-cloud offloading with and without 4G, the Nexus 5X devices were removed as they exhibited some issues when performing Device-to-Device (D2D) communications, namely, making it impossible to make Bluetooth connections from or to these devices (something that did not happen with the Samsung's devices). Additionally, when acting as a hotspot, the Nexus 5X would randomly disconnect clients.

The following configurations were used for Iris: a) no edge cloud offloading ("noe"); b) no edge cloud offloading with 4G ("noe 4g"); c) offloading using hotspots ("go" (Group Owners)); d) offloading with hotspots using 4G ("go 4g"); e) offloading using WiFi P2P ("wd"); f) offloading using WiFi P2P and 4G ("wd 4g"); g) and lastly, offloading using Bluetooth ("bt"). Bluetooth with 4G or with WiFi Direct were not considered because it faced several issues with Android's Bluetooth stack that caused overall system degradation.

For WiFi-Direct experiments ("go" and "go 4g") a proxy server hat to be deployed in all devices to allow potential WiFi-Direct clients to be able to access our server. By default, Android does not perform NAT in WiFi-Direct groups. Furthermore, number of nodes per group was limited to 4. For higher bitrates, larger groups became unstable.

Figure 15:
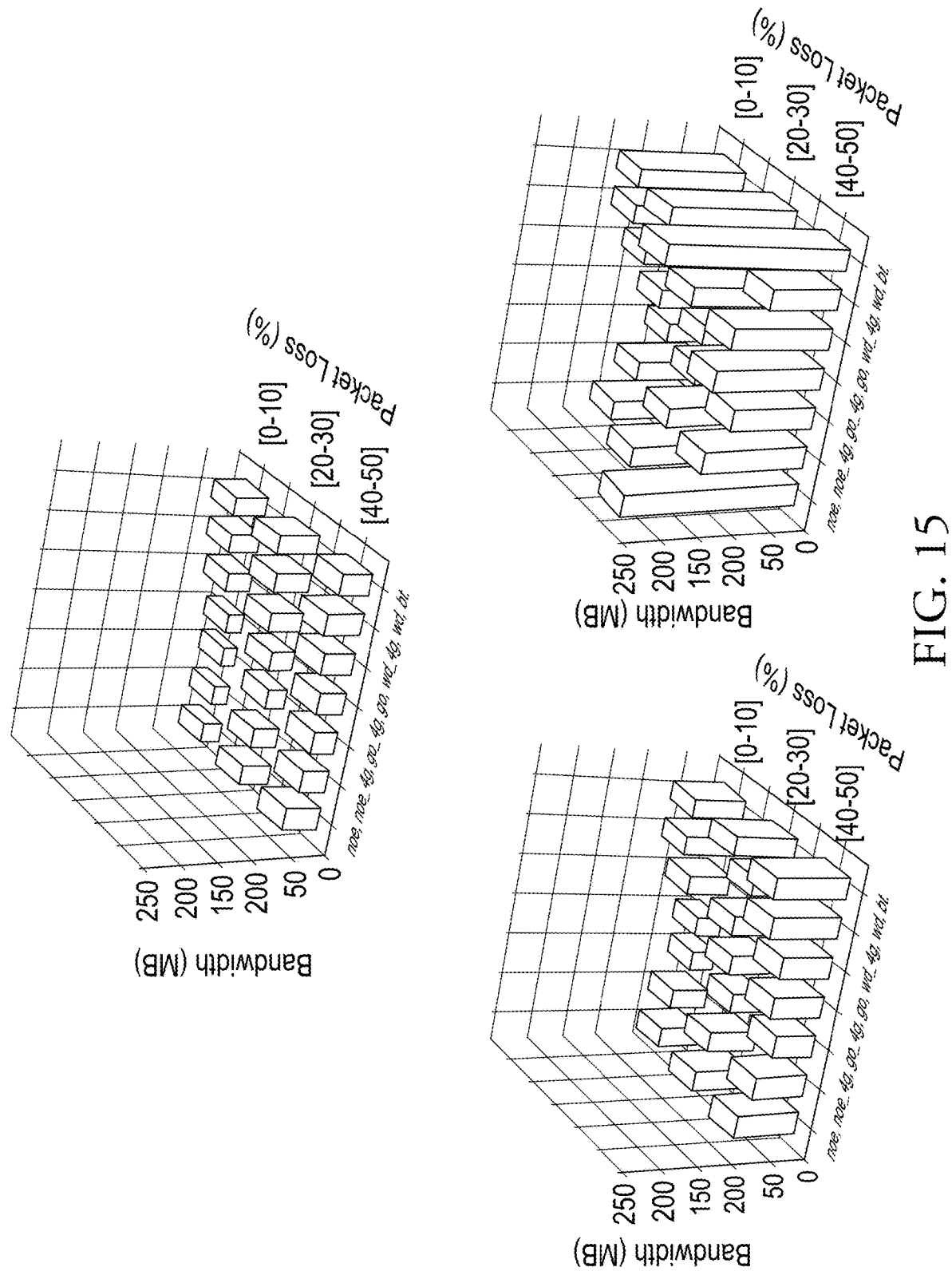
FIG. 15: Shows a schematic representation of an embodiment of the total WiFi download bandwidth usage (250 Kbit/s, 500 Kbit/s and 1000 Kbit/s) with edge offloading.
Figure 16:
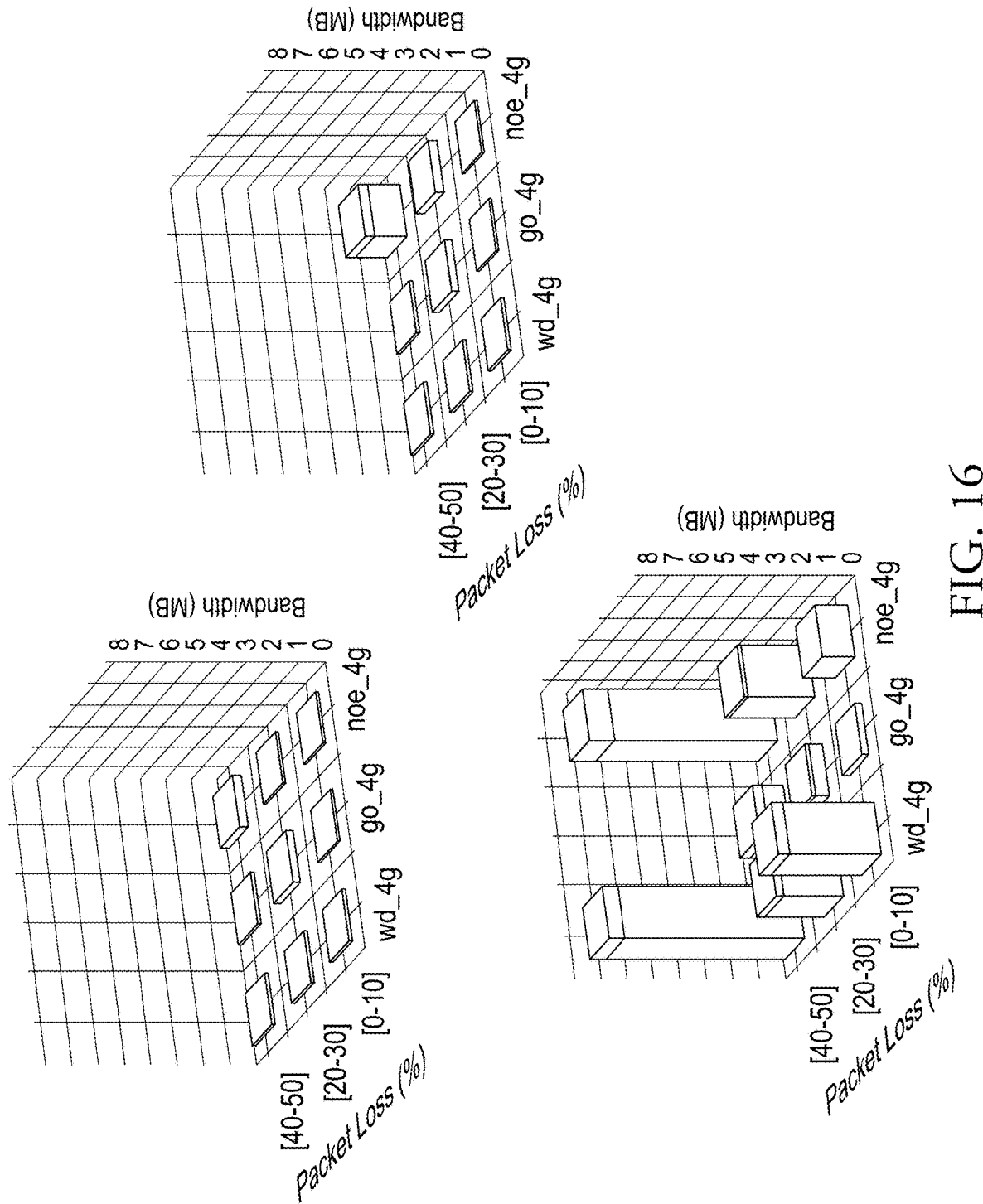
FIG. 16: Shows a schematic representation of an embodiment of the total 4G download bandwidth usage (250 Kbit/s, 500 Kbit/s and 1000 Kbit/s) with edge offloading.

In an embodiment, the Bandwidth Usage-Offloading can be considered by the impact on the bandwidth usage was assessed with the introduction of edge offloading, for both WiFi (FIG. 15) and 4G (FIG. 16). The best configuration for Iris, under [0-10]% packet loss, was achieved when using "go 4g" exhibiting 22.63±1.06 (MB), 34.7±0.99 (MB) and 70.29±1.91 (MB), for 250 Kbit/s, 500 Kbit/s and 1000 Kbit/s, respectively.

In an embodiment, For [20-30]% packet loss: Iris' best configuration for 250 Bkit/s was reached with "go 4g" featuring 27.24±3.27 (MB). To be noted that "go 4g" only used 0.19±0.25 (MB) of 4G data. In this configuration only the group owners (hotspots) are allowed to use 4G since the other devices only get retransmissions from the group owner. When streaming at 500 Kbit/s, it achieved 47.77±2.2 (MB) when using "go 4g", while using 0.12±0.05 (MB) of 4G data. When not using 4G, the "go" configuration uses 61.81±4.89 (MB). At the highest bitrate (1000 Kbit/s), "go 4g" uses 96.08±5.51 (MB) while using 0.48±0.22 (MB) of 4G data.

In an embodiment, For [40-50]% packet loss: when using 250 Kbit/s, Iris' best configuration was attained by "go 4g" with 33.27±1.55 (MB), when using 0.17±0.07 (MB) of 4G data. When streaming at 500 Kbit/s, "go 4g" achieves 60.93±1.27 (MB) while using 0.31±0.13 (MB) of 4G data. Lastly, when streaming at 1000 Kbit/s, "go 4g" features 118.36±0.82 (MB) while using 6.23±1.48 (MB) of 4G data.

In an embodiment, the Latency-Offloading can be considered in the present disclosure.

Figure 17:
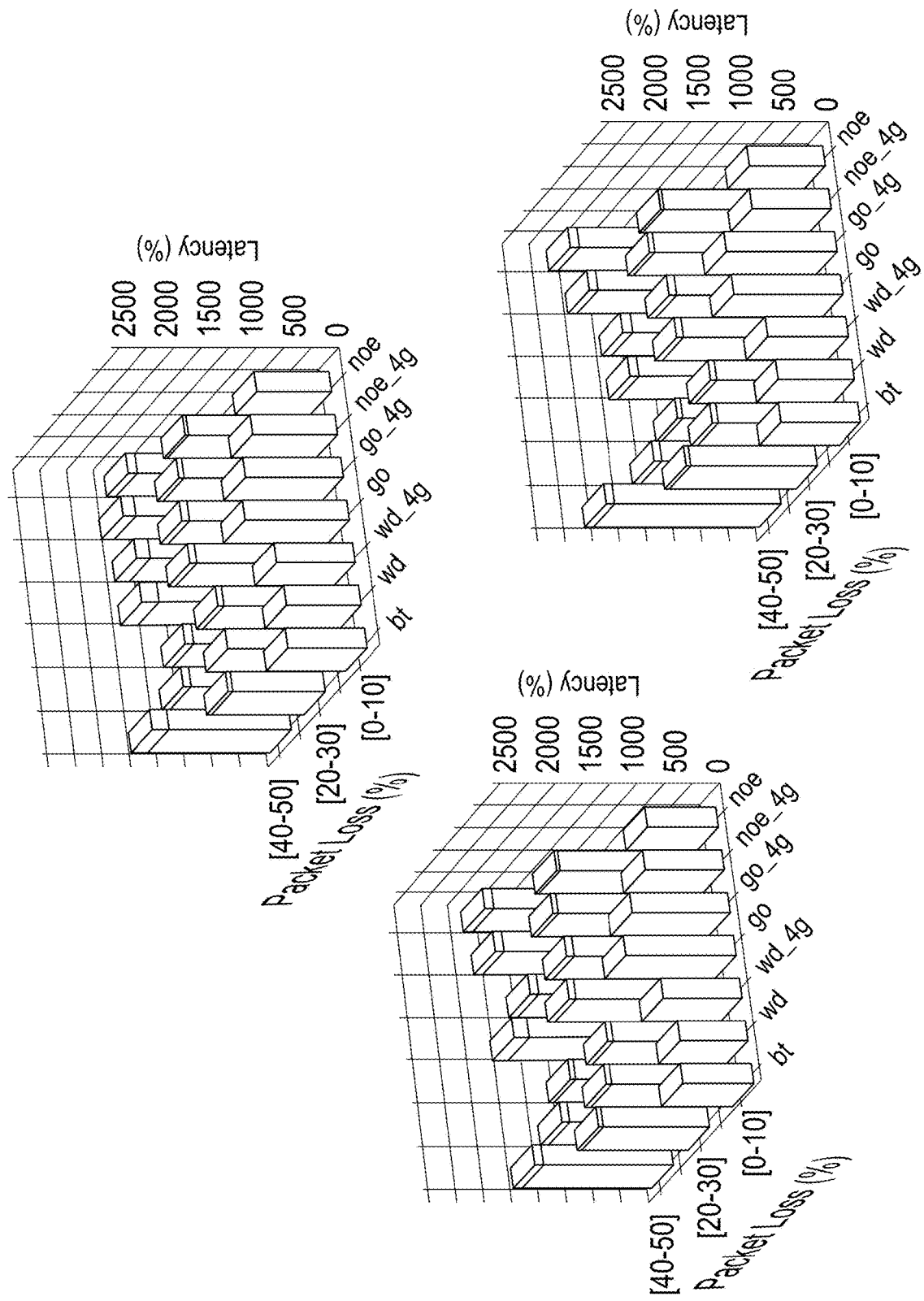
FIG. 17: Schematic representation of an embodiment of the video startup latency (250 Kbit/s, 500 Kbit/s and 1000 Kbit/s) with edge offloading.

The video streaming startup latency reflects the amount of time required before it starts to be display at the user's mobile after initial request. FIG. 17 shows the results for video latency while using edge offloading and 4G.

In an embodiment, for [0-10]% packet loss: the "noe" configuration had the best latency featuring 893.42±40.64 (ms) for 250 Kbit/s, 861.93±38.4 (ms) for 500 Kbit/s, and 1247.58±78.54 (ms) for 1000 Kbit/s.

In an embodiment, for [20-30]% packet loss: the best configuration was "wd mobile" for all bitrates, with 1038.33±65.13 (ms) for 250 Kbit/s, 1051.51±34.76 (ms) for 500 Kbit/s, and 1099.26±46.69 (ms) for 1000 kbit/s.

In an embodiment, for [40-50]% packet loss: following the previous trend, "wd 4g" is the best configuration across all bitrates achieving 1030.95±47.32 (ms) for 250 Kbit/s, 1015.09±39.82 (ms) for 500 Kbit/s, and 1057.17±53.17 (ms) for 1000 Kbit/s.

In an embodiment, the Missed Deadlines-Offloading can be considered in the present disclosure.

Figure 18:
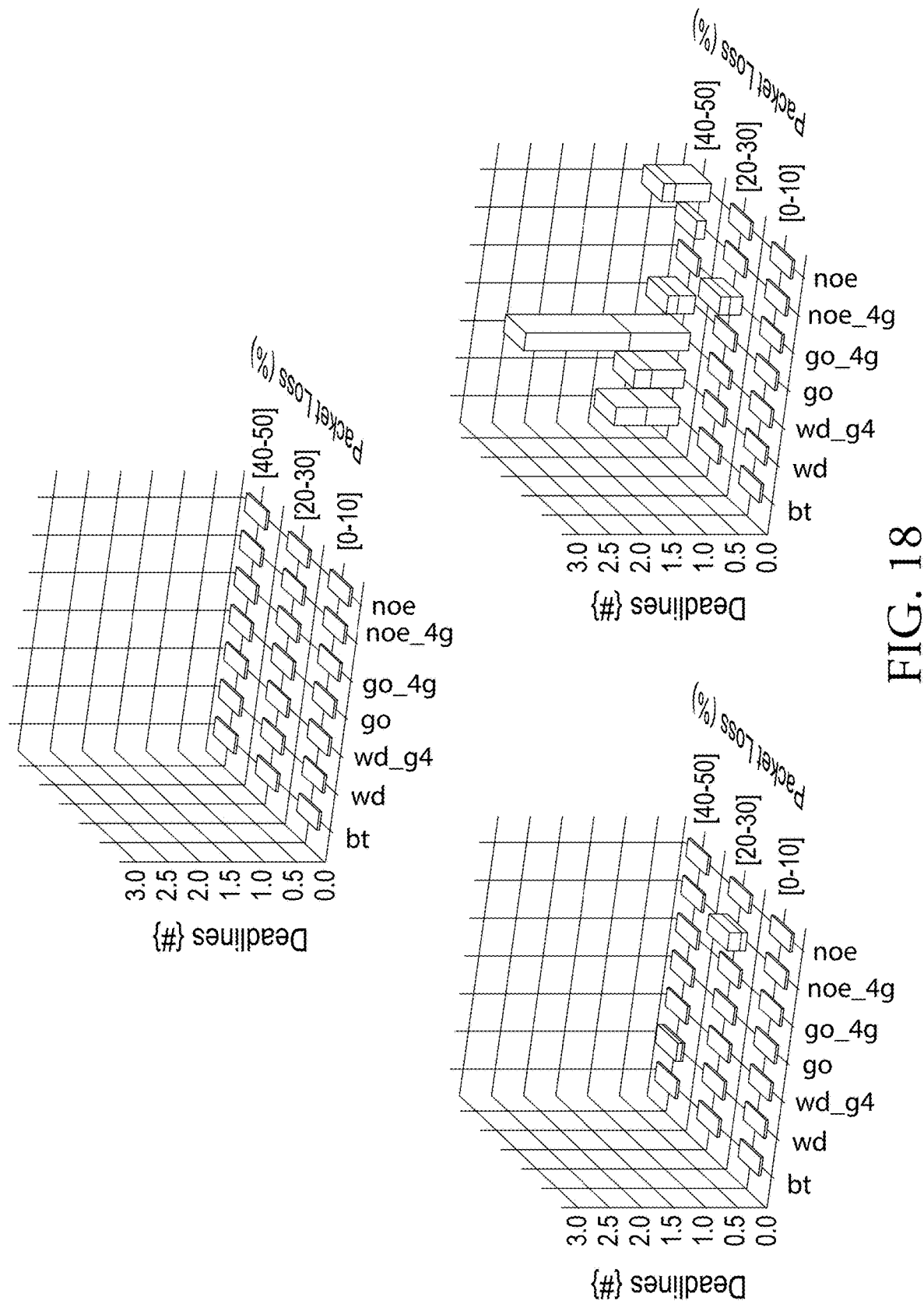
FIG. 18: Schematic representation of an embodiment of the missed deadlines (250 Kbit/s, 500 Kbit/s and 1000 Kbit/s).
Figure 19:
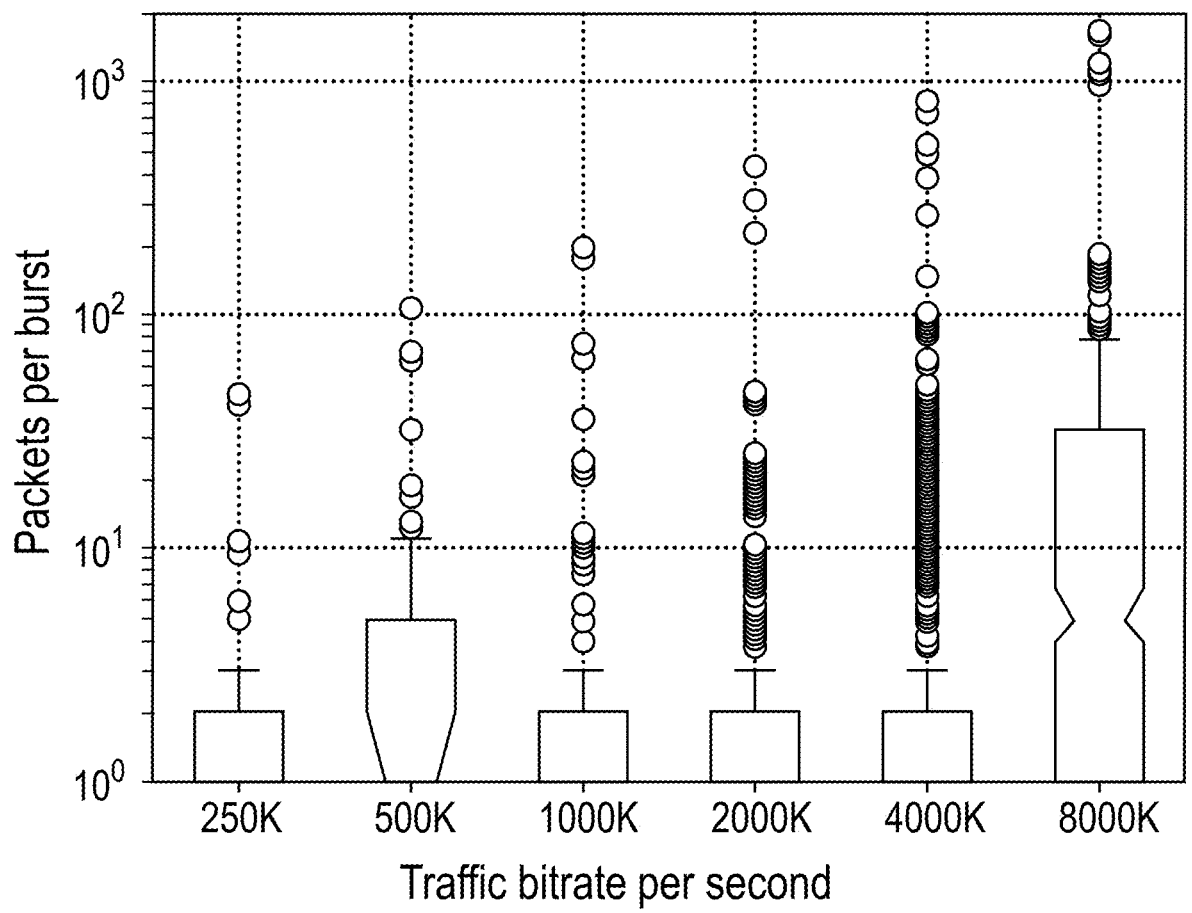
FIG. 19: Schematic representation of an embodiment of the burst packet losses using 802.11n multicast using iperf.

In order to assess reliability, the number of packets lost, as a result of missed deadlines was measured, and presented it in FIG. 18.

The present disclosure only experienced residual missed deadlines when streaming at 1000 Kbit/s under [40-50]% packet loss. Here the worst configuration was "wd 4g" with an average bellow 1 and a variance lesser than 2. Given that the total number of packets sent in the base stream (not counting retransmissions) is around 19000 (with a payload of 2068 bytes per packet) for a 5 minute run using a 1000 Kbit/s bitrate, then the deadline miss rate is below 0.0001%. All other configurations had negligible missed deadlines.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A computer-implemented system for live-streaming video over at least one multichannel wireless network, comprising at least one streaming server connected to a plurality of mobile user devices as streaming clients, wherein the at least one streaming server comprises:
    a stream handler for obtaining data packets from a received video live-stream, and
    a network scheduler for scheduling the transmission, and retransmission when deemed necessary by the at least one streaming server, of transmission data packets and retransmission data packets, respectively;
    wherein the at least one streaming server is arranged to perform Forward Erasure Correction (FEC) to encode the obtained data packets to transmission data packets for transmission to the streaming clients;
    wherein the at least one multichannel wireless network comprises a plurality of wireless channels wherein said channels comprise two or more distinct wireless technology types;
    wherein the network scheduler comprises a plurality of sub-schedulers, wherein the network scheduler comprises a respective sub-scheduler for each wireless channel, and is arranged such that:
    transmission data packets are scheduled for transmission by a first sub-scheduler;
    transmission packets that are determined as missing at the first sub-scheduler are scheduled for retransmission at the first sub-scheduler; and
    retransmission packets that are determined as missing more than a predetermined number of times at a second sub-scheduler of said plurality of sub-schedulers, wherein the retransmission packets are passed to a subsequent sub-scheduler;
    wherein the stream handler comprises a buffer for incoming encoded segments and an aggregator for aggregating the buffered segments in groups using a predefined threshold, and
    wherein the network scheduler comprises a composition of said sub-schedulers arranged in a pipeline.

2. The system according to claim 1, wherein the at least one streaming server is arranged to
    encode a transmission matrix by:
        placing transmission packets in a predetermined number of rows and a predetermined number of columns using row-major order until waiting until the transmission matrix is full;
        calculating an erasure encoding parity for each column and adding the calculated erasure encoding parity for each column at the end of the respective column at one or more matrix blocks to form one or more column parity rows;
        calculating an erasure encoding parity for each row, including the calculated column parity rows, and adding the calculated row parity at the end of the respective row at one or more matrix blocks to form one or more row parity columns, such that blocks belonging for both row parity data and column parity data are row parity over column parity data; and
        transmitting the matrix in column-major order.

3. The system according to claim 2, wherein the FEC encoding is runtime adjustable by dynamically adjusting the number of parity rows and the number of column parity rows.

4. The system according to claim 2, wherein the at least one streaming server is arranged to not retransmit parity packets.

5. The system according to claim 4, wherein each streaming client is arranged to report packet reception by transmitting a reception report to the corresponding at least one streaming server to which the respective streaming client is connected, the number of the last transmission matrix that was fully received followed by a bitmap representation of each of the outstanding transmission matrixes, wherein a 0 encodes a missing packet and a 1 otherwise, or vice-versa.

6. The system according to claim 5, wherein the bitmap representation is compressed using a lossless image compression method.

7. The system according to claim 5, wherein each streaming client is further arranged to report packet reception by transmitting the reception report through each of the wireless channels, wherein the reception report for each wireless channel also comprises the respective RSSI, received signal strength indication, and used wireless technology type.

8. The system according to claim 1, wherein the network scheduler is arranged such that retransmission packets that are determined as missing more than a predetermined number of times at a last sub-scheduler are discarded or looped-back to the first sub-scheduler.

9. The system according to claim 1, wherein each sub-scheduler comprises a filter for filtering out packets to be excluded from retransmission and wherein the filter comprises a machine-learning classifier for predicting packet loss ratio for unicast transmission and for predicting the bitmap layout of the transmission matrix for multicast transmission, for excluding packets from retransmission.

10. The system according to claim 1, wherein the FEC encoding is application-level FEC (AL-FEC), wherein the FEC encoding is operated within the application layer.

11. The system according to claim 1, wherein the at least one multichannel wireless network comprises a multicast WiFi channel of a local area wireless network, a unicast WiFi channel of a local area wireless network, and a unicast mobile network channel of a broadband cellular mobile phone network.

12. The system according to claim 1, further comprising opportunistic network edge offloading, wherein the streaming clients are arranged to:

periodically request missing packets from all available neighbouring streaming client using a mesh connection.

13. The system according to claim 12, wherein all transmitted and retransmitted packets are digitally signed, whether as grouped or individually.

14. The system according to claim 13, wherein the packets are signed individually by the packet sender and signed as group within a chunk of video by the video stream creator.

15. The system according to claim 13, wherein a signature is obtained by independent symmetric keys.

16. The system according to claim 1, further comprising a plurality of said streaming servers, each streaming server arranged to transmit to a specific geographical section which is distinct of the geographical sections of the other streaming servers.

17. The system according to claim 1, wherein the at least one streaming server is arranged to encode a source coding for retransmission data packets for transmission to the streaming clients, using a linear combination of packets to overcome missing packets at the streaming clients.

18. The system according to claim 17, wherein packets that are not required because of the FEC encoding are not to be retransmitted and are not included at source coding.

19. The system according to claim 17, wherein the source coding is interleaved for dual-interleaved communication.

20. The system according to claim 1, wherein each streaming client is arranged to provide an Extend Real-Time Messaging Protocol (RTMP) replacement.

\* \* \* \* \*